US006336029B1

(12) United States Patent
Ho et al.

(10) Patent No.: US 6,336,029 B1
(45) Date of Patent: *Jan. 1, 2002

(54) METHOD AND SYSTEM FOR PROVIDING INFORMATION IN RESPONSE TO QUESTIONS

(76) Inventors: Chi Fai Ho, 4816 Cabello Ct., Union City, CA (US) 94587; Peter P. Tong, 1807 Limetree La., Mountain View, CA (US) 94040

( * ) Notice: Subject to any disclaimer, the term of this patent is extended or adjusted under 35 U.S.C. 154(b) by 40 days.

This patent is subject to a terminal disclaimer.

(21) Appl. No.: 09/596,844

(22) Filed: Jun. 19, 2000

Related U.S. Application Data

(63) Continuation of application No. 09/347,184, filed on Jul. 2, 1999, which is a continuation of application No. 09/139,174, filed on Aug. 24, 1998, now Pat. No. 5,934,910, which is a continuation of application No. 08/758,896, filed on Dec. 2, 1996, now Pat. No. 5,836,771.

(51) Int. Cl.$^7$ .................................................. G09B 7/00
(52) U.S. Cl. ........................ 434/362; 434/118; 434/169; 434/323; 704/9; 704/260; 706/927
(58) Field of Search ................................. 434/118, 156, 434/169, 185, 219, 307 R, 308, 322, 323, 327, 350, 335, 362, 365; 704/9, 270, 102, 3, 8, 260, 258, 265, 266; 701/200, 207, 209; 705/1, 7, 10, 74; 707/1–4, 6, 9, 100, 104.1, 219, 102, 501.1, 500, 532; 706/927; 340/995; 345/810; 455/3.04; 713/155; 725/1, 14, 25, 35, 46, 34, 116, 12 P; 709/219

(56) References Cited

U.S. PATENT DOCUMENTS

| | | |
|---|---|---|
| 4,847,784 A | 7/1989 | Clancey |
| 4,914,590 A | 4/1990 | Loatman et al. |
| 5,301,314 A | 4/1994 | Gifford et al. |
| 5,309,359 A | 5/1994 | Katz et al. |
| 5,404,295 A | 4/1995 | Katz et al. |

(List continued on next page.)

FOREIGN PATENT DOCUMENTS

| | | |
|---|---|---|
| EP | 0 436 459 A | 7/1991 |
| WO | WO 93/21587 | 10/1993 |
| WO | WO 95/02221 | 1/1995 |

OTHER PUBLICATIONS

Success Maker Courseware, published by Computer Curriculum Corporation, Dec. 1994.
Active Mind Series from World Wide Web, URL=http://www.broderbund.com/studio/ams.html, 1996.
Logical Journal of the Zoombinis from World Wide Web, URL=http://www.broderbund.com/studio/atoz/zoombini.html, 1996.
Selecting "Software" by PC Novice Series, vol. 3, Issue 12, pp. 51, 64, and 89–92. 1995.

(List continued on next page.)

*Primary Examiner*—Joe H. Cheng
(74) *Attorney, Agent, or Firm*—Beyer Weaver & Thomas, LLP

(57) ABSTRACT

An apparatus and a system to teach a user a subject based on his questions. The system allows the user to control his learning process, and helps to fill in gaps of misunderstanding in the subject. In one embodiment, the system, including a database, presents study materials on the subject to the user. After working on the presented materials, the user enters his question into the system, which generates an answer to the question, and presents it to him. Then the system compares the question with one or more questions previously entered by the user to determine his understanding level in the subject. Based on the determination, the system may present to the user appropriate study materials. The user typically asks more than one question, and the process of answering his question by the system repeats.

86 Claims, 16 Drawing Sheets

U.S. PATENT DOCUMENTS

| | | | |
|---|---|---|---|
| 5,446,883 A | | 8/1995 | Kirkbride et al. |
| 5,454,106 A | | 9/1995 | Burns et al. |
| 5,519,608 A | | 5/1996 | Kupiec |
| 5,581,664 A | | 12/1996 | Allen et al. |
| 5,586,218 A | | 12/1996 | Allen |
| 5,652,828 A | | 7/1997 | Silverman |
| 5,677,835 A | | 10/1997 | Carbonell et al. |
| 5,701,399 A | | 12/1997 | Lee et al. |
| 5,754,938 A | * | 5/1998 | Herz et al. .................. 725/116 |
| 5,754,939 A | * | 5/1998 | Herz et al. .................. 455/3.04 |
| 5,787,234 A | | 7/1998 | Molloy |
| 5,794,050 A | | 8/1998 | Dahlgren et al. |
| 5,797,135 A | | 8/1998 | Whalen et al. |
| 5,835,087 A | * | 11/1998 | Herz et al. .................. 345/810 |
| 5,852,814 A | | 12/1998 | Allen |
| 5,884,302 A | | 3/1999 | Ho |
| 5,909,679 A | * | 6/1999 | Hall ............................. 707/4 |
| 5,933,531 A | | 8/1999 | Lorie |
| 5,933,816 A | | 8/1999 | Zeanah et al. |
| 5,959,543 A | | 9/1999 | LaPorta et al. |
| 5,963,948 A | * | 10/1999 | Shilcrat ....................... 707/100 |
| 5,999,908 A | * | 12/1999 | Abelow ........................ 705/1 |
| 6,076,088 A | | 6/2000 | Paik et al. |
| 6,088,717 A | | 7/2000 | Reed et al. |

OTHER PUBLICATIONS

Computerized Adaptive Testing, Oct. 24, 1994, from World Wide Web, URL=Gopher://Gopher.ETS.org, Oct. 1994.

Innovation and Technologies, Oct. 21, 1994, from World Wide Web, URL=Gopher://Gopher.ETS.org, Oct. 1994.

Interactive Mathematics Instructor's Guide by Academic Systems, pp. 86 and 114, Aug. 1995.

"High School Learning and Resource Library" by ProOne, photocopy of the box and screen–dump to get 5 pages, 1995.

Woods, W.A., "Semantics And Quantification In Natural Language Question Answering," AcadEmic Press, pp. 205–248, 1978.

Whalen, Thomas, "*Computational Behaviourism Applied to Natural Langauge,*" Communications Research Centre, Ottawa, ON, Apr. 1996, 29 pages.

Bunt, Harry C., "*Dialog Control Functions and Interaction Design,* " Institute for Language Technology and Artificial Intelligence ITK, The Netherlands (in Dialog and Instruction: Modeling and Interaction in Intelligent Tutoring Systems, Heidelberg: Springer Verlag), pp. 197–214, 1995.

Whalen, Thomas, "*CHAT Conversational Hypertext Access Technology,*" webpage: http://debra.dgbt.doc.ca/chat/info.page.html, Apr. 1993.

"*The CHAT Natural Language System,*" webpage: http://debra.dgbt.doc.ca/chat/chat.html, Dec. 1999.

Prince, Violaine M., "*Relying on a Sophisticated Student Model to Derive Dialog Strategies in an Intelligent Tutoring System,*" Dialog and Instruction: Modeling and Interaction in Intelligent Tutoring Systems, Heidelberg: Springer Verlag, pp. 179–194, 1995.

Kaplan, S. Jerrold, "*Cooperative Responses From a Portable Natural Language Database Query System,*" Computational Models of Disclosure, MIT Press, Chapter 3, pp. 167–201, 1983.

Norvig, Peter, Paradigms Of Artificial Intelligence Programming: Case Studies In Common LISP, "*STUDENT: Solving Algebra Word Problems,*" Chapter 7, Morgan Kaufmann Publishers, pp. 219–235, 1992.

Hendrix et al., "*Developing a Natural Language Interface to Complex Data,*" Association for Computing Machinery (ACM), 1978, p. 563–584.

Burton et al., "*Toward a Natural–Language Capability for Computer–Assisted Instruction,*" Natural Language Processing, Kaufmann Publishers, pp. 605–624, 1986.

Androutsopoulos et al., "*Natural Language Interfaces to DatabaseS–An Introduction,*" Department of Artificial Intelligence, University of Edinburgh, U.K., Mar. 1995, p. 1–50.

Norvig, Peter, "Paradigms Of Artificial Intelligence Programming: Case Studies In Common LISP, "*STUDENT: Solving Algebra Word Problems,*" Chapter 7," Morgan Kaufmann Publishers, 1992, pp. 219–235.

Response Generation, "*Question–Answering Systems,*" Chapter 16, and "*Natural Language Generation,*" Chapter 17, pp. 468–513, before 1996.

Burke et al., "*Knowledge–based Information Retrieval from Semi–Structured Text,*" The Artificial Intelligence Laboratory, The University of Chicago, Nov. 1995.

* cited by examiner

⌐ 260

Identify the Algorithm
Corresponding to the Noun   ∼ 262

Applies the Algorithm
to Data Selected by   ∼ 264
Other Components

Transform the Non-aux
Verb to Select Verbs ~ 300
Having Similar Meaning

Transform Other
Components to Identify ~ 302
Data in the Attributes

550

Compare Question with
Questions in the Database  ~ 552

▼

Retrieve Answer
Corresponding to the  ~ 554
Matched Question

Figure 13

METHOD AND SYSTEM FOR PROVIDING INFORMATION IN RESPONSE TO QUESTIONS

This application is a continuation of U.S. patent application Ser. No. 09/347,184, filed on Jul. 2, 1999, the disclosure of which is hereby incorporated by reference, which is a continuation of U.S. patent application Ser. No. 09/139,174, filed on Aug. 24, 1998, now U.S. Pat. No. 5,934,910, which is a continuation of U.S. patent application Ser. No. 08/758,896, filed on Dec. 2, 1996, now U.S. Pat. No. 5,836,771; with the applications and patent being incorporated by reference into this application.

BACKGROUND

This invention relates generally to education and, more particularly, to computer learning based on question asking.

Question asking is an important aspect in learning because we have a better understanding in a subject if we can ask questions. As opposed to passive leaning where we just absorb like a sponge, active learning based on asking questions enhances understanding and helps us remember. However, if a person is learning from a computer system, he does not have the luxury of having a question-and-answer dialog with the computer.

Asking questions not only focuses our attention on the subject, it also fills gaps in our understanding. When we are learning from an instructor, typically we cannot comprehend everything. As our misunderstanding grows, very soon we begin to lose track of the subject, and our interest in the subject wanes. Similarly, we lose interest in reading a book with many individuals if we confuse their names. During those instances, asking questions to fill our gaps of misunderstanding might rekindle our interest in the subject or the book.

A user's questions on a subject also indicate how much he understands the subject, If the user repeatedly asks questions in a certain area, he is weak in that area.

In view of the importance of question asking, many instructors include them in teaching. One of the most famous teachers—Socrates—even used questions as his main tool to stimulate thinking and to teach. However, when a computer teaches, the users cannot question the computer the same way he can question his instructor.

Learning through a computer has its benefits. Computer allows a user to learn at his own pace. For a class of thirty, typically the instructor will not hold up the class just to clarify issues for one student. If students' levels of understanding are not the same, the instructor has to leave some of them behind. This problematic situation is prevalent in a classroom with students having different cultural backgrounds and non-uniform understanding levels. Computers can ameliorate such problems. If each student is taught by his computer, he can control the computer so as to learn at his own pace.

However, learning from a computer has its handicap. When the student needs an answer for a question, problem arises because the computer cannot understand his question.

There are computers responding to questions. One is the system to locate books used in many libraries. Users can enter search-requests for books into the system. But such systems are primitive as compared to those where a user can learn a subject by asking questions.

Another system responding to questions is called Elisa. It responds to questions, and tries to emulate a psychiatrist. A user enters a question into Elisa, which changes the entered question around to respond to the user. For example, the user enters, "I feel bad." Elisa might respond, "Why do you feel bad?" The system gets the user to talk, and presumably, the user feels better afterwards. The goal of the system is not to understand the user, but to encourage the user to communicate his problem.

There are also systems that respond to questions written in computer languages. In such systems, the user re-formulates his question into a program to access and to process information from a database. Someone not familiar with programming languages cannot get an answer from those systems.

It should have been obvious that there is a need for a method and a system that can teach a subject through responding to a user's questions.

SUMMARY

This invention is on a method and a system that can teach a subject based on a user's questions. It is different from the user learning a subject through passively absorbing the materials. In this invention, he sets the learning pace, controls the learning process, and can learn by asking questions.

In one embodiment, the system generates study materials that introduce the subject to the user. After studying the presented materials, he can begin asking questions. The system generates an answer to each question, and presents it to him. The system also compares the question with one or more questions previously entered by him. The comparison determines his understanding level in the subject. If the comparison indicates that he is weak in a certain area, the system can present detailed study materials covering those areas. The system also stores the question he just asked, so as to compare to questions he might ask in the future.

Typically the user does not ask one question and stop. He may ask a series of questions to understand the subject. After the system has responded to his questions, based on his understanding level, the system may present to him additional study materials. The process may repeat with him asking additional questions until he understands the subject.

In another embodiment, the user can use the system to fill gaps of misunderstanding in a subject. As he works on the subject through the computer, he encounters areas that he does not understand or he has forgotten. This embodiment allows him to get answers on questions in those areas.

Other aspects and advantages of this invention will become apparent from the following detailed description, which, when taken in conjunction with the accompanying drawings, illustrates by way of example the principles of the invention.

BRIEF DESCRIPTION OF THE DRAWINGS

FIG. 13 shows a set of steps to be used by the embodiment shown in FIG. 12.

Same numerals in FIGS. 1–14 are assigned to similar elements in all the figures. Embodiments of the invention are discussed below with reference to FIGS. 1–14. However, those skilled in the art will readily appreciate that the detailed description given herein with respect to these figures is for explanatory purposes as the invention extends beyond these limited embodiments.

DETAILED DESCRIPTION

Figure 1:
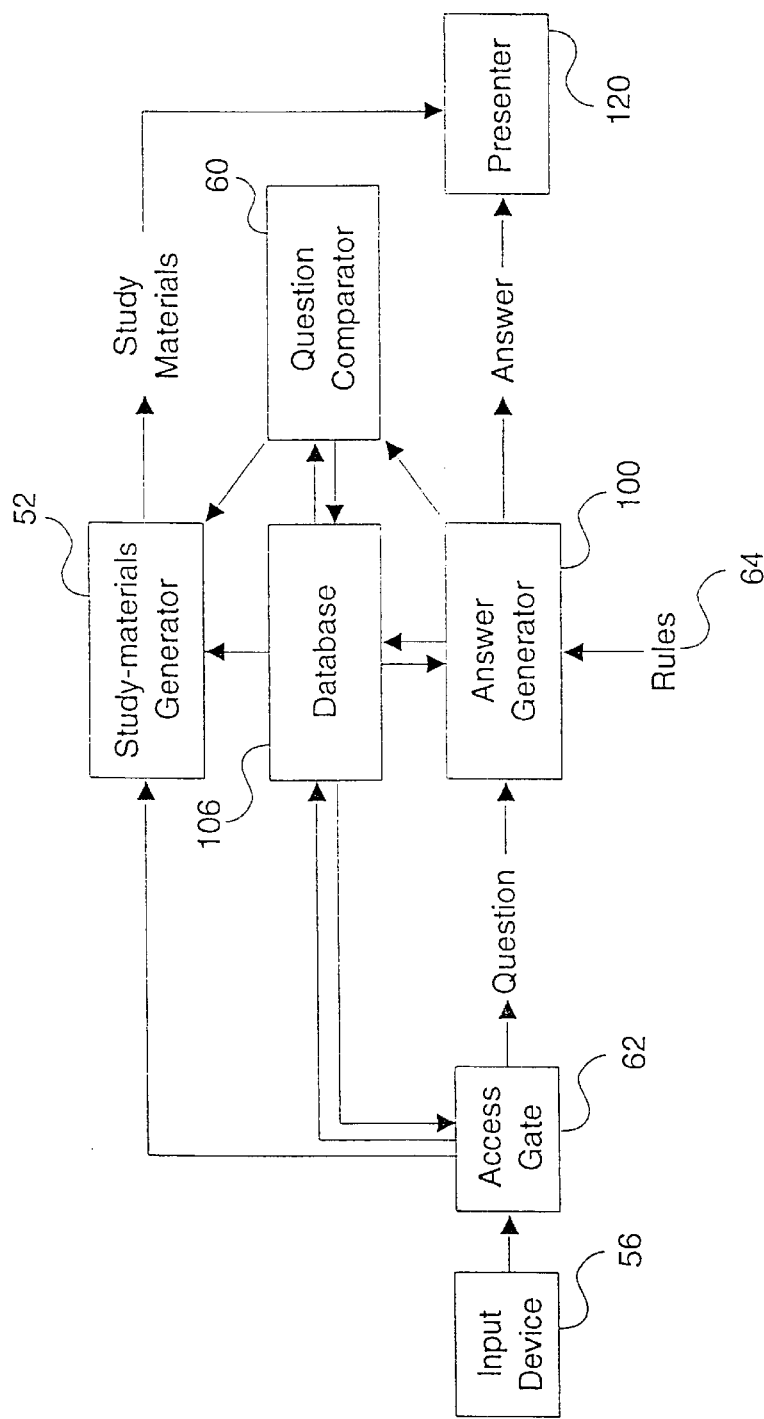
FIG. 1 shows one embodiment of the present invention.

FIG. 1 shows one embodiment of a system 50 in this invention. When a user starts working on a subject, a study-materials generator 52 generates introductory study materials using information from a database 106. A presenter 120 presents those materials. After studying the presented materials, the user might need to ask a question. He enters the question into the system 50 through an input device 56. An answer generator 100 retrieves the question and generates an answer based on information from the database 106 and a set of rules 64. The presenter 120 then presents the answer to him. A question comparator 60 also can compare the question with one or more questions he previously asked. Those questions were stored in the database 106. The comparison determines his understanding level in the subject. If the comparison indicates he is weak in a certain area, the study-materials generator 52 will retrieve study materials from the database 106 covering that area. The database 106 also stores the question just asked for future comparison.

Figure 2:
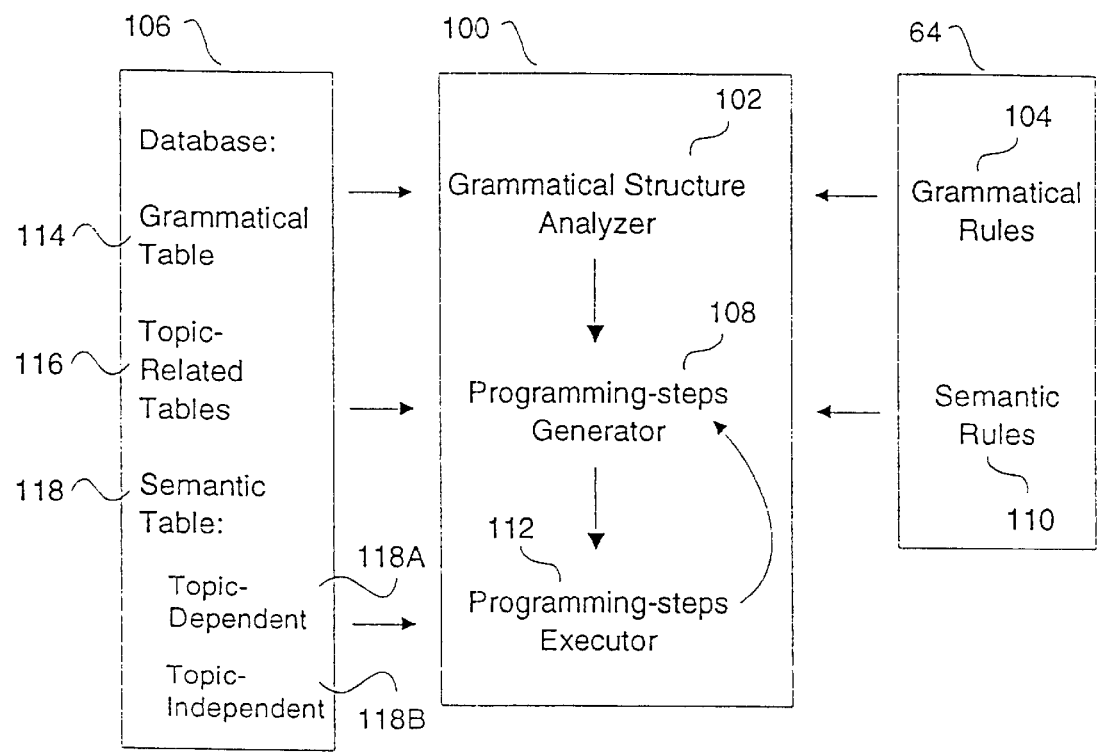
FIG. 2 shows one embodiment of the answer generator in the present invention.

FIG. 2 shows one embodiment of the answer generator 100 for answering a natural-language question, which is a question used in our everyday language. In the present invention, a question is defined as an inquiry demanding an answer; and an answer is defined as a statement satisfying the inquiry.

An input device, such as a keyboard, a mouse or a voice recognition system, receives the natural-language question. Then a grammatical structure analyzer 102 analyzes the grammatical structure of the question for parsing the question into its grammatical components based on a pre-defined context-free grammatical structure. The analyzer 102 performs its tasks using a set of grammatical rules 104, and data from the database 106. Then a programming-steps generator 108 automatically generates one or more instructions based on the components. The generator 108 performs its tasks using a set of semantic rules 110 and data from the database 106. The instructions flow to a programming-steps executor 112, which executes the instructions. More than one set of instructions might be generated and executed. In at least one set of instructions, when it is executed, it queries and processes data from the database 106 for generating an answer to the question. The presenter 120, which is an output device, such as a monitor, a printer or a voice synthesizer, presents the answer to a user of the system.

Figure 3A:
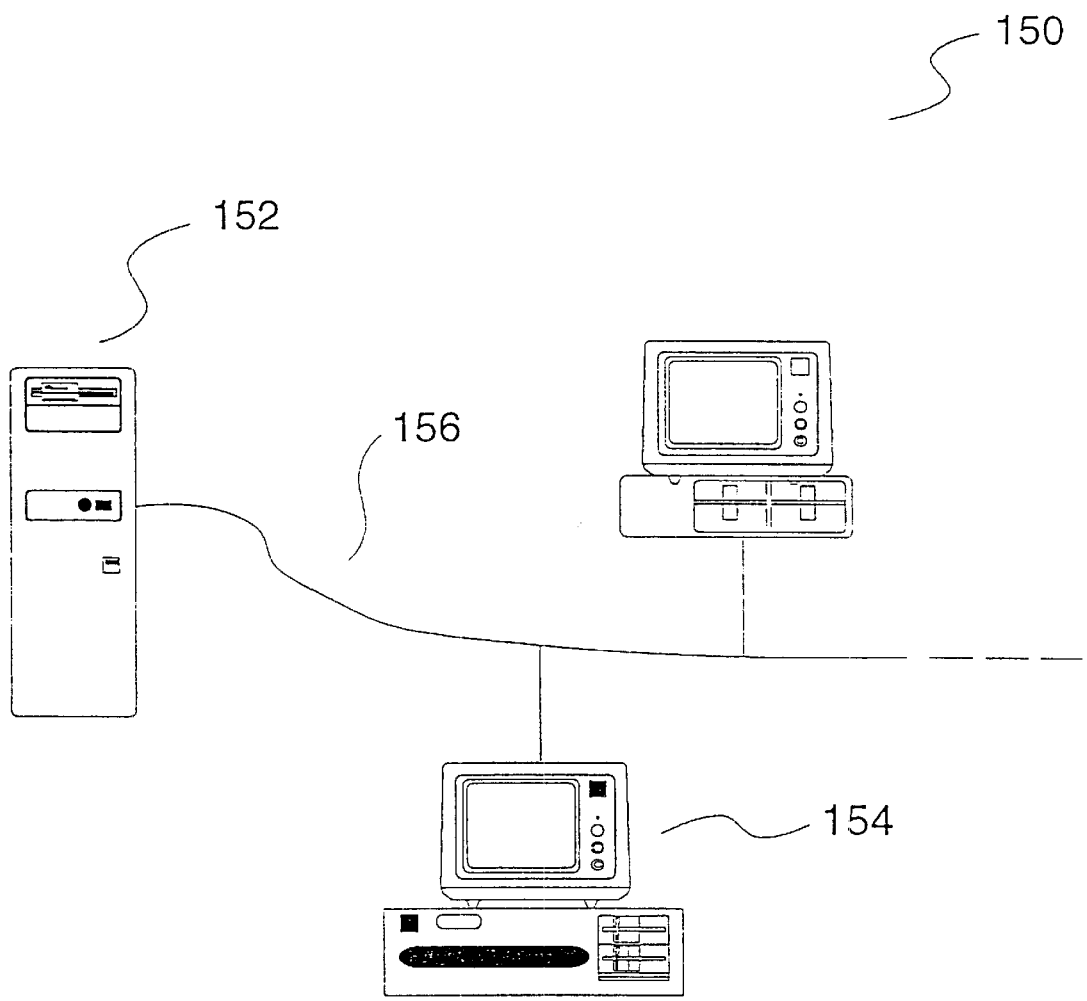
FIGS. 3A–B show physical elements implementing one embodiment of the present invention.

FIG. 3A shows one physical embodiment 150 implementing one embodiment of the invention, preferably in software and hardware. The embodiment 150 includes a server computer 152 and a number of client computers, such as 154, which can be a personal computer. Each client computer communicates to the server computer 152 through a dedicated communication link, or a computer network 156.

Figure 3B:
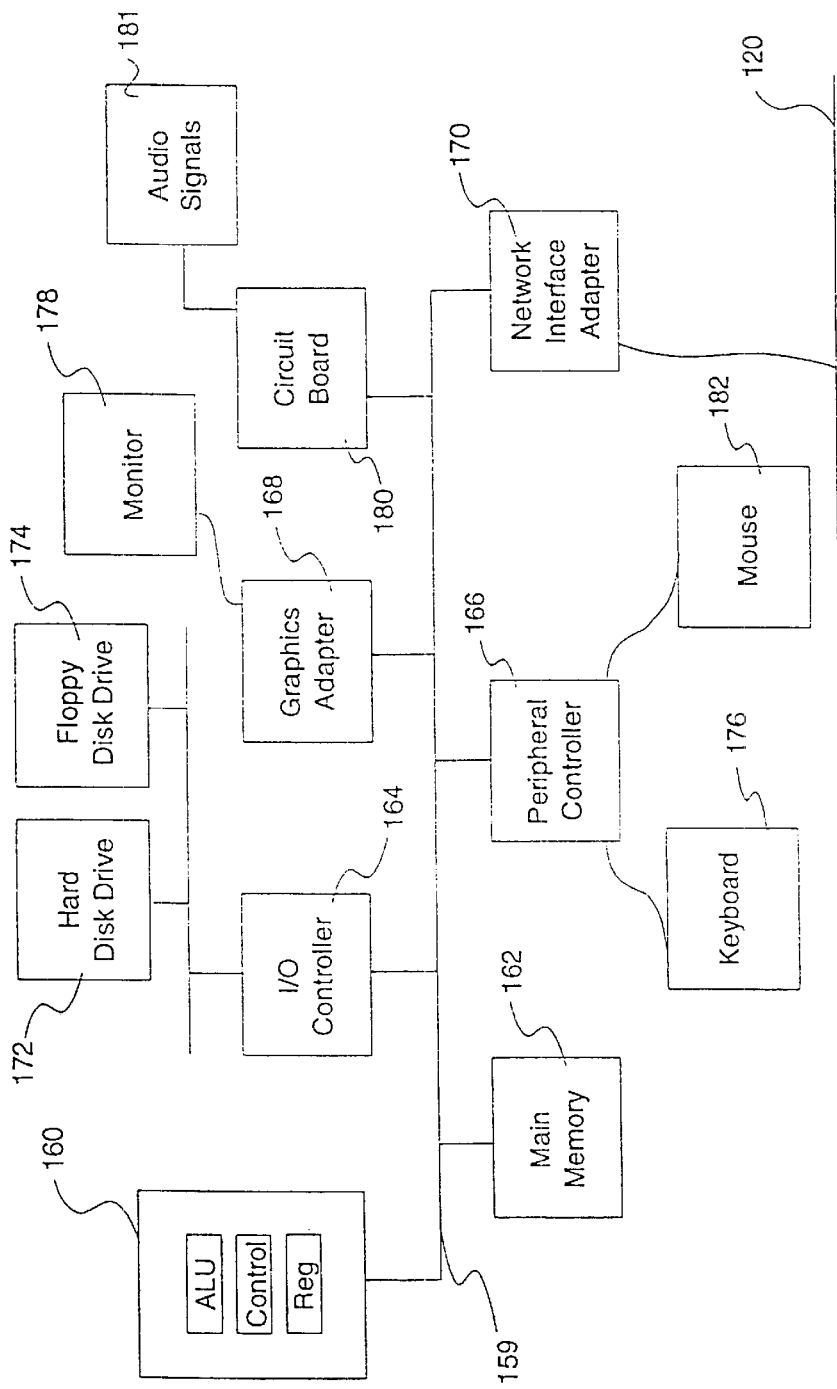

FIG. 3B shows one embodiment of a client computer 154. It typically includes a bus 159 connecting a number of components, such as a processing unit 160, a main memory 162, an I/O controller 164, a peripheral controller 166, a graphics adapter 168, a circuit board 180 and a network interface adapter 170. The I/O controller 164 is connected to components, such as a hard disk drive 172 and a floppy disk drive 174. The peripheral controller 166 can be connected to one or more peripheral components, such as a keyboard 176 and a mouse 182. The graphics adapter 168 can be connected to a monitor 178. The circuit board 180 can be coupled to audio signals 181; and the network interface adapter 170 can be connected to the network 120, which can be the Internet, an intranet, the Web or other forms of networks. The processing unit 160 can be an application specific chip.

Different elements in the present invention may be in different physical components. For example, the input device 56, the presenter 120, the grammatical structure analyzer 102 and the grammatical rules may be in a client computer; and the study-materials generator 52, the question comparator 60, the database 106, the programming-steps generator 108 and the program executor 112 may reside in a server computer. In another embodiment, the database is in the server computer; and the input device 56, the study-materials generator 52, the question comparator 60, the grammatical structure analyzer 102, the programming-steps generator 108, the program executor 112 and the rules reside in a client computer. Yet in another embodiment, the embodiment 50 is in a client computer.

In this invention, the subject can be broad or narrow. In one embodiment, the subject can cover mathematics or history, or it can cover the JAVA programming language. In another embodiment, the subject covers information in a car, such as a Toyota Camry, and the user wants to understand this merchandise before buying it. In yet another embodiment, the subject covers the real estate market in a certain geographical area, and again the user wants to understand the market before buying a house.

As an example, the subject is American history. Historical facts and insights are arranged in chronological order. It starts with an introduction of the British empire before 1776, and then other information is arranged sequentially in time. In one embodiment, events happened within a certain time frame, such as one week, are grouped together as one item. And items can form a hierarchy structure. There can be a day-item, week-item, month-item and year-item. There can be long periods of time without significant events, and this leads to a month-item or a year-item.

Figure 4:
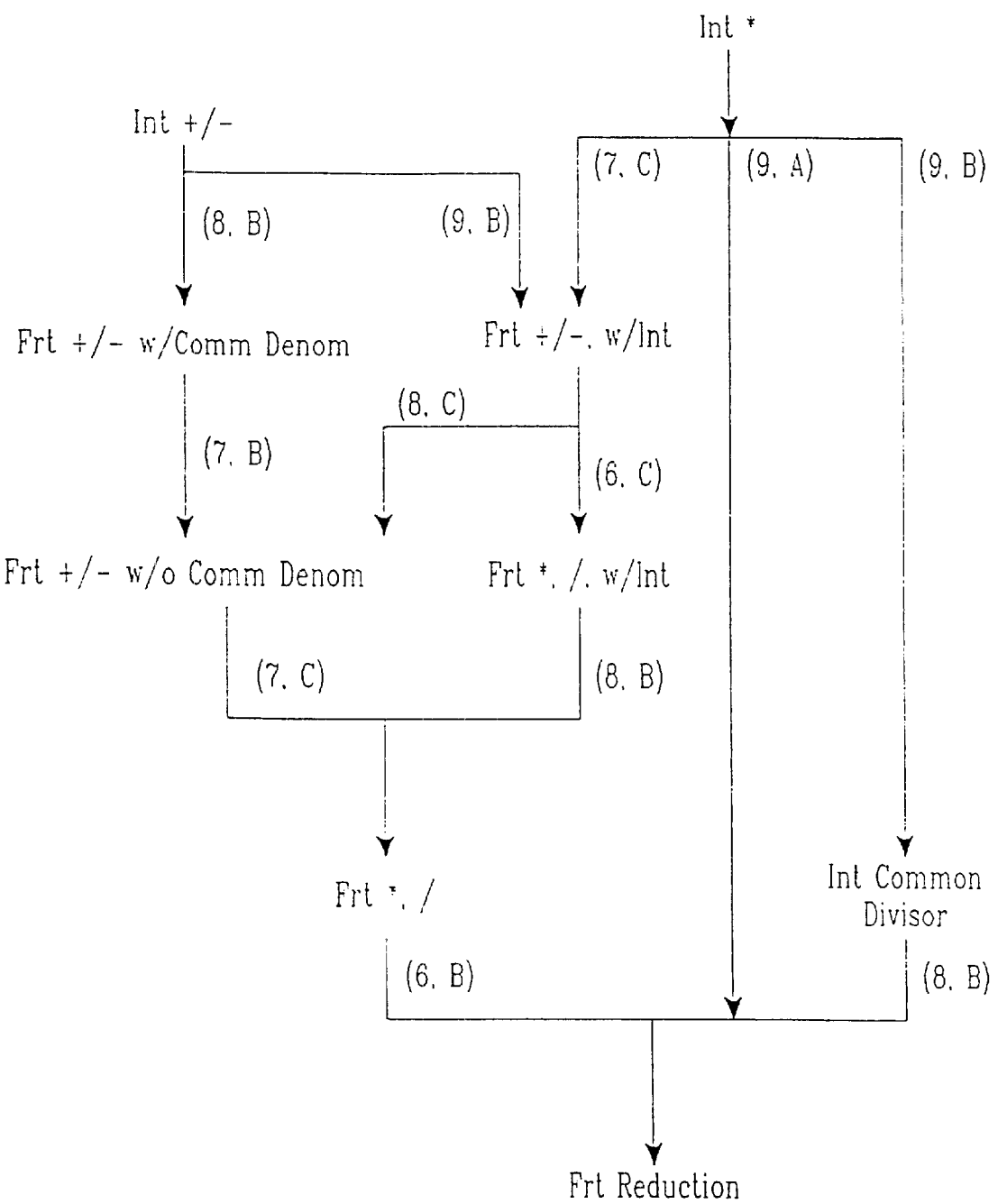
FIG. 4 illustrates a part of an hierarchy for the line-items under fractions in the present invention.

As another example, the subject is mathematics, which is separated into major-topics, minor-topics and line-items:

Major Topics Under Mathematics
Calculus
Geometry
Trigonometry
. . .
High School Algebra
   Minor Topics Under High School Algebra
   Decimal Numbers
   Polynomials
   Linear Equations
   Quadratic Equations
   . . .
   Integers
      Line Items Under Integers
      Addition & Subtraction (Int+/−)
      Multiplication (Int*)
      Division
      Prime Numbers
      Factorization
      Common Divisor
      . . .
   Fractions
      Line Items Under Fractions
      Addition and Subtraction with Common Denominator (Frt+/− w/Comm Denom)
      Addition and Subtraction with Integers (Frt+/−, w/Int)
      Addition and Subtraction without Common Denominator (Frt+/− w/o Comm Denom)
      Multiplication and Divisions with Integers (Frt*,/w/Int)
      Multiplication and Division with fraction (Frt*,/)
      Compound Fractions
      Fraction Reduction (Frt Reduction)
      Ratios and Proportions The major-topics, minor-topics and line-items form a hierarchy tree, which shows their relationships, and their relative difficulties. Each line-item also has a number of difficulty levels ranging from 1 to 10. FIG. 4 illustrates a part of such an hierarchy for the line-items under fractions. For every path in the figure, there is a number and an alphabet in parenthesis. The number denotes the minimal difficulty level, and the alphabet denotes the minimal grade that the user has to achieve before the user is qualified to work on the subsequent line-item. For example, the user has to achieve at least a difficulty level of 8 and a grade of B for the line-item of Int+/− before the user is qualified to work on the line-item of Frt+/− w/Comm Denom. Generating study materials for each difficulty level of each line-item should be obvious to those skilled in the art.

In one embodiment, the system 50 further includes an access gate 62. When the user wants to learn a subject, he enters his name and may be his password with the title of the subject he wants to learn through the input device 56 into the access gate 62. The access gate 62 accesses the database to determine if he has used the system before, or if the user has used the system to learn the subject before. If he has not used the system to learn the subject before, the access gate 62 asks the study-materials generator 52 to retrieve introductory study materials on the subject for the user. In another embodiment, the subject does not have any introductory materials, and he starts the learning process by entering questions.

In yet another embodiment, the database 106 stores the questions asked by a number of prior users, and the question comparator 60 compares the questions asked by them to determine questions that are commonly-asked. Comparison processes will be described below. The term "cornnonly-asked" may be defined as being asked by more than 50% of the prior users, or by other metrics. The study-materials generator 52 retrieves a set of study materials answering the commonly-asked introductory question, and presents them to him. Answer-generation processes will be described below.

For different parts of the subject, again there might be one or more questions commonly asked by others. Answers to those questions can be presented to him when he starts working on those areas of the subject.

Figure 5:
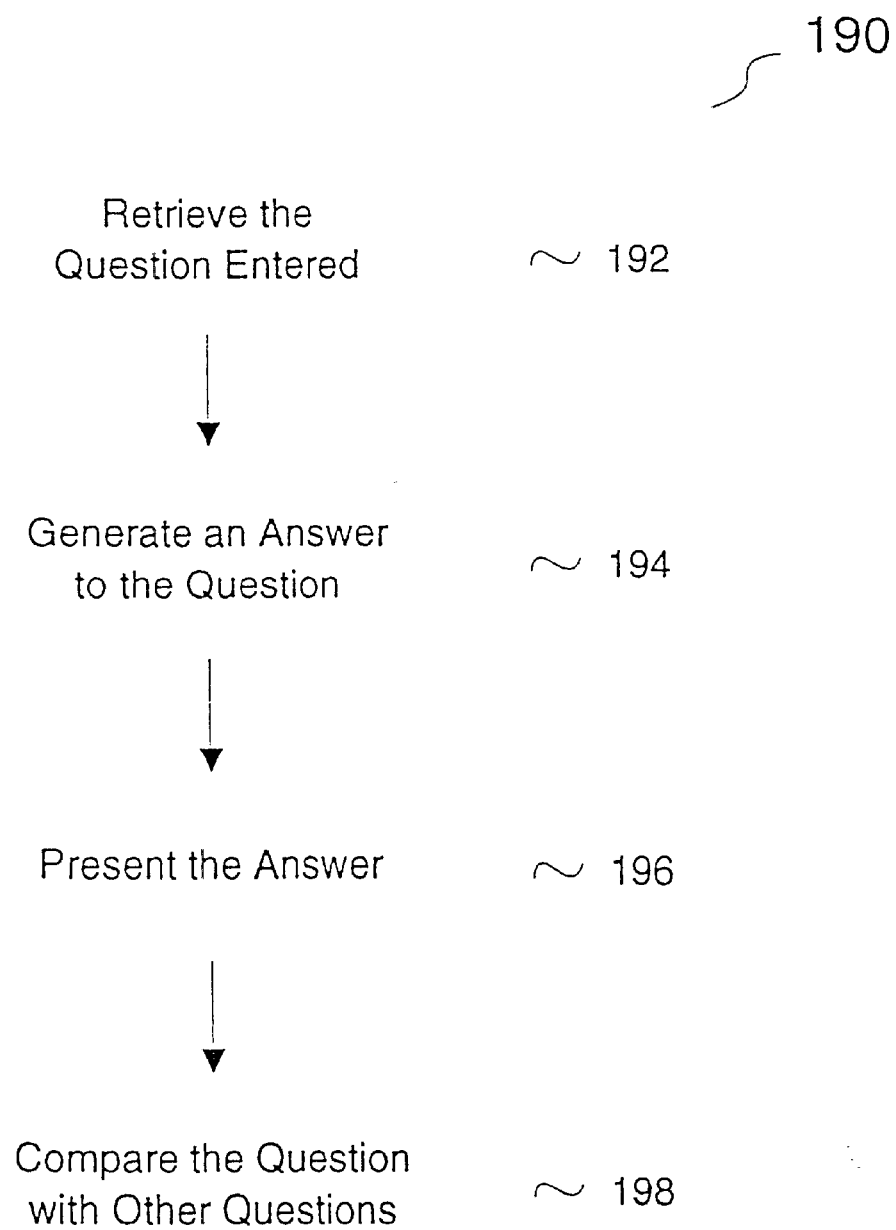
FIG. 5 shows one embodiment implementing the present invention.

After learning the introductory material, the user may start asking questions by entering them into the system. Each question may be entered into the system 50 orally through a voice recognition input device, or through a keyboard, or other types of input device 56. FIG. 5 shows one embodiment 190 implementing the present invention. First, the answer generator 100 retrieves (Step 192) the question entered, and generates (Step 194) an answer to the question. The presenter 120 then presents (Step 196) the answer to the question, and the comparator 60 compares (Step 198) with one or more questions previously entered by the user to determine his understanding level in the subject. The sequence of the steps of comparing (198) and presenting (196) can be changed, or the two steps can be simultaneously performed.

In one embodiment, the question just asked by the user is stored in the database 106 with his identity. In another embodiment, the database also stores a time-stamp indicating the time when the user asks the question.

There are a number of ways to generate (Step 194) an answer to the question entered. The following description starts with answering natural-language questions that are grammatically context-free, and then extends to answering other types of questions.

A natural-language question can be in English or other languages, such as French. Examples of natural-language questions are:
   Who is the first President?
   What are the Bills of Right?
   Where is the capital of Texas?
   What is the immediate cause to the Civil War?
   Why did President Nixon resign?
   Who is the third President?
   Who is the President after John Kennedy?
   When did President Lyndon Johnson die?
   When was President Nixon born?
   What is the derivative of sin(x+4) with respect to?
   Why is delta used in step 4 of the proof?

A statement that is not based on a natural language is a statement that is not commonly used in our everyday language. Examples are:
   For Key in Key-Of(Table) do
   Do while x>2

A grammatically-context-t-free question is a question whose grammar does not depend on the context. Each word in the question has its own grammatical meaning, and does not need other words to define its grammatical meaning. Hence, the grammatical structure of the question does not depend on its context. Note that "a word" can include "a number of contiguous words." This is for situations where a term includes more than one word but has only one grammatical meaning, such as the preposition "with respect to."

The question includes one or more grammatical components. A grammatical component is a component with one or more grammatical meanings, which are defined by a set of grammatical rules to be explained below. For example, the word "president" is a noun, which has a grammatical meaning. So the word "president" is a grammatical component.

The present invention includes a database, which can be a relational database, an object database or other forms of database The database can reside in a storage medium in a client computer, or a server computer, or with part of it in the client computer and another part in the server computer.

In one embodiment, the database includes a number of tables. A table can be treated as a set of information or data grouped together that have some common characteristics. The data in each table can be further divided into different areas, and each area is represented by an attribute, which is equivalent to an identifier for a group of data that are more narrowly focused than all the data in a table. In the present invention, tables and attributes have similar function, except a table may be considered to have a broader coverage, and an attribute a narrower focus. In some examples, a table has two dimensions, as will be explained below.

Some values or data in the database may be unique. For example, if a value is a person's social security number, that value is unique. Such values are known as key values, and their corresponding attributes are known as key attributes. Note that a table can have one or more key attributes, and a key attribute may in turn be formed by more than one attribute.

One embodiment of the database 106 includes a grammatical table 114, one or more topic-related tables 116, and two semantic tables, 118A and 118B. In a general sense, the grammatical table 114 determines the grammatical meaning of each word in the question, such as whether a word is a noun or a verb. Each topic-related table 116 groups data related to a topic together in a specific format. Separated into a topic-dependent semantic table 118A and a topic-independent semantic table 118B, the semantic tables define the semantic meaning of each word, such as whether a word refers to an algorithm or data in a topic-related table.

The grammatical table 114 defines the grammatical meanings of words used in the natural-language question. If questions entered into the system is limited to only one subject, such as history, the grammatical table will include words in that subject, and words commonly-used by a user of the system in asking questions. Each word in the table may be defined in the following format:

```
CREATE TABLE Grammatical (
    word                Character string NOT NULL,
                        //the word
    grammatical-meaning Character string NOT NULL, //e.g.
                        "Examiner"
                        //has "noun" as its grammatical
                        meaning
)
```

Each topic-related table combines data related to a topic in a specific format. As an example, one table includes all the data related to the Presidents of the United States, and another includes all the data related to the First Ladies of the United States. The table may be two-dimensional, and include a number of columns and rows. All the data in a column or a row typically have one or more common characteristics. For example, one row includes data that identify all the bills passed by the Presidents. For a two-dimensional table, data in a row can have one characteristic, and data in a column can have another characteristic. For example, data in one column identify the heights of the Presidents, and data in a row identify data related to one specific President; the following describes an example of data alone the row:

```
CREATE TABLE PRESIDENT AS (
    //Table of all U.S. Presidents & Vice Presidents
    Name         Character string KEY, //President Name--a key attribute
        Position      Character string,  //President, Vice President
        Start_Year    Integer,           //First Year of Presidency
        End_Year      Integer,           //Last Year of Presidency
        Born_Date     Date,              //Date of Birth
        Death_Date    Date,              //Date of death
)
```

There is also a table-structure dictionary, which defines how the topic-related tables arrange their data. This dictionary is typically not considered as a part of the database. It does not contain topic-related data, but it contains structures of the topic-related tables in the database. Many database management systems automatically generate the table-structure dictionary based on the programing statements defining the topic-related tables, such as the CREATE clauses in SQL-like languages. As an example, the table-structure dictionary defines the structure of the data in the above President table by indicating that the first entry represents the name of the president, the second the position, and so on. Thus, the dictionary can contain the name of the table (the table name), the name of the table's attributes (attribute names), and their corresponding data types.

A word in the question may need one or both of the semantic tables. The topic-independent semantic table 118B defines whether a word stands for an algorithm or data in a topic-related table. Such a table may be defined as follows:

```
CREATE TABLE Topic_Independent_Semantic (
    word       NOT NULL,  //the word
    semantics,            //Indicates if the word refers to data in a
                          //topic-related table, an algorithm etc.
                          If the
                          //word is mapped to an algorithm, that
                          //algorithm will also be identified,
                          as will be
                          //further explained below.
    synonym,              //A word might have synonyms,
                          as will be
                          //further explained below.
)
```

Words with similar meaning are grouped together and are represented by one of those words as the synonym for that group of words. If a word does not have other words with similar meaning, the synonym is the word itself.

Many words do not point to an algorithm. They correspond to data in topic-related tables. The topic-dependent semantic table 118A identifies the semantic meaning of those words through matching them to data in topic-related tables. For example, the adjective "first" applying to the President's table may operate on the data under the inauguration date attribute; on the other hand, the adjective "first" applying to the First Ladies' table may operate on the data under the date of death attribute. Such a topic-dependent table 118A may be defined as follows:

```
CREATE TABLE Topic_Dependent_Semantic (
    Table_Name NOT NULL,  //For a table with the name
                          Table_Name:
    Who_Attribute,        //The attribute associated with 'who'
    When_Attribute,       //The attribute name associated with
                          'when'
```

-continued

```
    {i-pronoun}__Attribute,    //The attribute associated with the
                               //{i-pronoun}. The symbols { }
                               denote the
                               //word it contains. Here, the word is
                               //an i-pronoun.
    . . .
    {Adj}__Attribute,
        //The attribute associated with the adjective {adj}. In this
        //example, the word is an adjective.
    {Noun}__Attribute,
        //Attribute name associated with the noun {noun}. Certain
        //nouns may refer instead to an algorithm, such as "sum."
)
```

In one embodiment, the grammatical analyzer 102, the grammatical rules 104 and the grammatical table 114 are in a client computer. The programming-steps generator 108, the semantic rules 110, the semantic tables 118 and the table-structure dictionary are in a middleware apparatus, which can be a Web server. The programming-steps executor 112 with the topic-related tables are in a back-end server, which can be a database server.

One embodiment includes a computer-readable medium that encodes with a data structure including the semantic tables 118. Another embodiment includes a computer-readable medium that encodes with a data structure including the semantic tables 118 and topic-related tables 116. Yet another embodiment includes a computer-readable medium that encodes with a data structure including the semantic tables 118 and the grammatical table 114. Yet a further embodiment includes a computer-readable medium that encodes with a data structure including the grammatical table 114, the topic-related tables 116 and the semantic tables 118.

Figure 6:
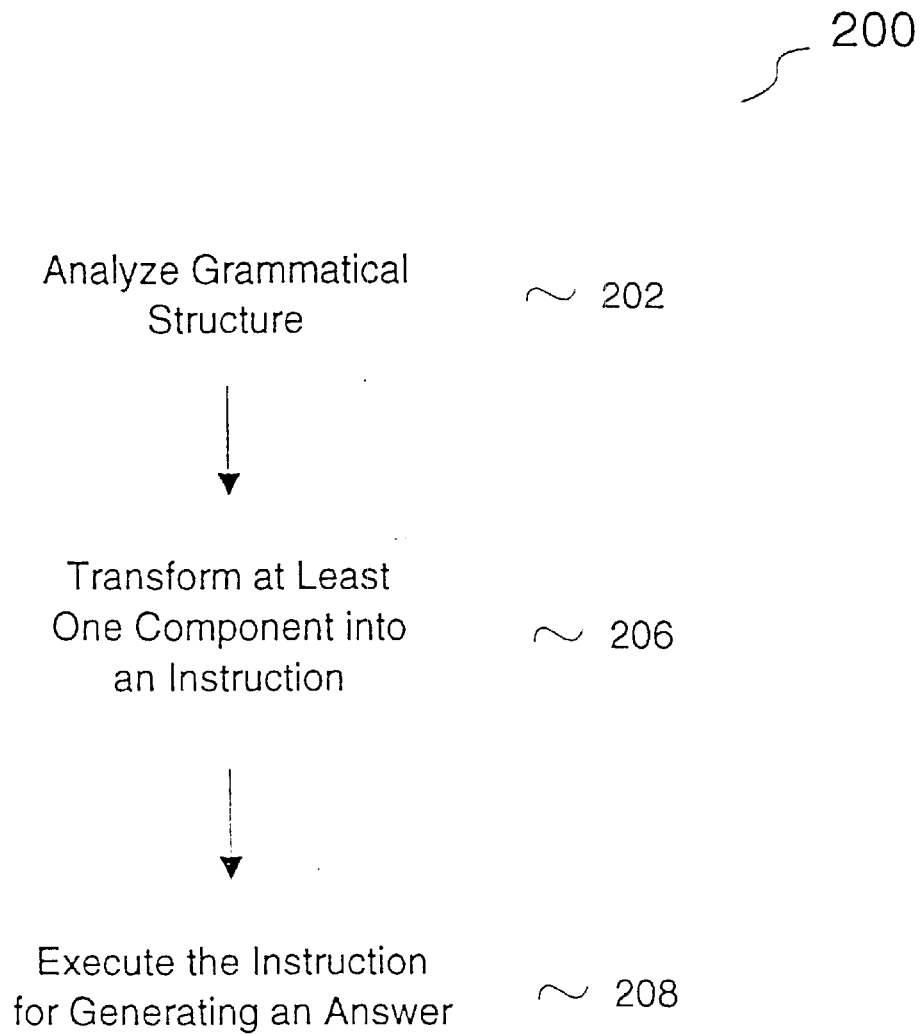
FIG. 6 shows a set of steps to be used by the embodiment shown in FIG. 2.

FIG. 6 shows a set 200 of steps to implement one embodiment of the present invention. A natural-language question is entered into the answer generator 100. The system analyzes (Step 202) the grammatical structure of the question so as to parse it into its grammatical components, based on a pre-defined context-free grammatical structure. This task uses a set of grammatical rules 104 and the grammatical table 114. Then, the system transforms (Step 206) at least one component into one or more instructions using a set of semantic rules 110 with one or both of the semantic tables 118. Then, the one or more steps are executed (Step 208) to access and process data from one or more topic-related tables so as to generate an answer to the question.

In another embodiment, the programming-steps generator 108 transforms all the grammatical components of the question into instructions using semantic rules 110 with one or both of the semantic tables. Then the executor 112 executes all the steps to access and process data from one or more topic-related tables for generating an answer to the question.

Grammatical Structure Analyzer

In one embodiment, the analyzer 102 scans the question to extract each word in the question. Then the analyzer 102 maps each extracted word to the grammatical table 114 for identifying its grammatical meaning. For example, the word "Clinton" is identified by the grammatical table to be a proper noun; and the word "sum" is a noun. After establishing the grammatical meaning of each word, the analyzer 102 uses a set of grammatical rules to establish the grammatical components of the question based on the pre-defined context-free grammatical structure.

For a number of words, their grammatical meaning depend on their adjacent words. In one embodiment, the analyzer 102 combines each word with its contiguous words to determine its grammatical component. For example, if the word is "With," in analyzing its Grammatical meaning, the analyzer 102 identifies its contiguous words. If its contiguous words are "respect to," then the three words are combined together and are considered as one preposition. Thus, to determine grammatical meaning of a word, the analyzer identifies that word, and then a number of words following it, such as two words following it. The analyzer 102 analyzes the identified words as a unit. If the analyzer 102 cannot identify the grammatical meaning of that sequence of words, the analyzer 102 removes the last word from the sequence, and analyzes them again. The process repeats until either a grammatical meaning is found, or there is no more word. Any time when the analyzer 106 has identified a grammatical meaning, that word or sequence of words would be considered as one unit.

Figure 7:
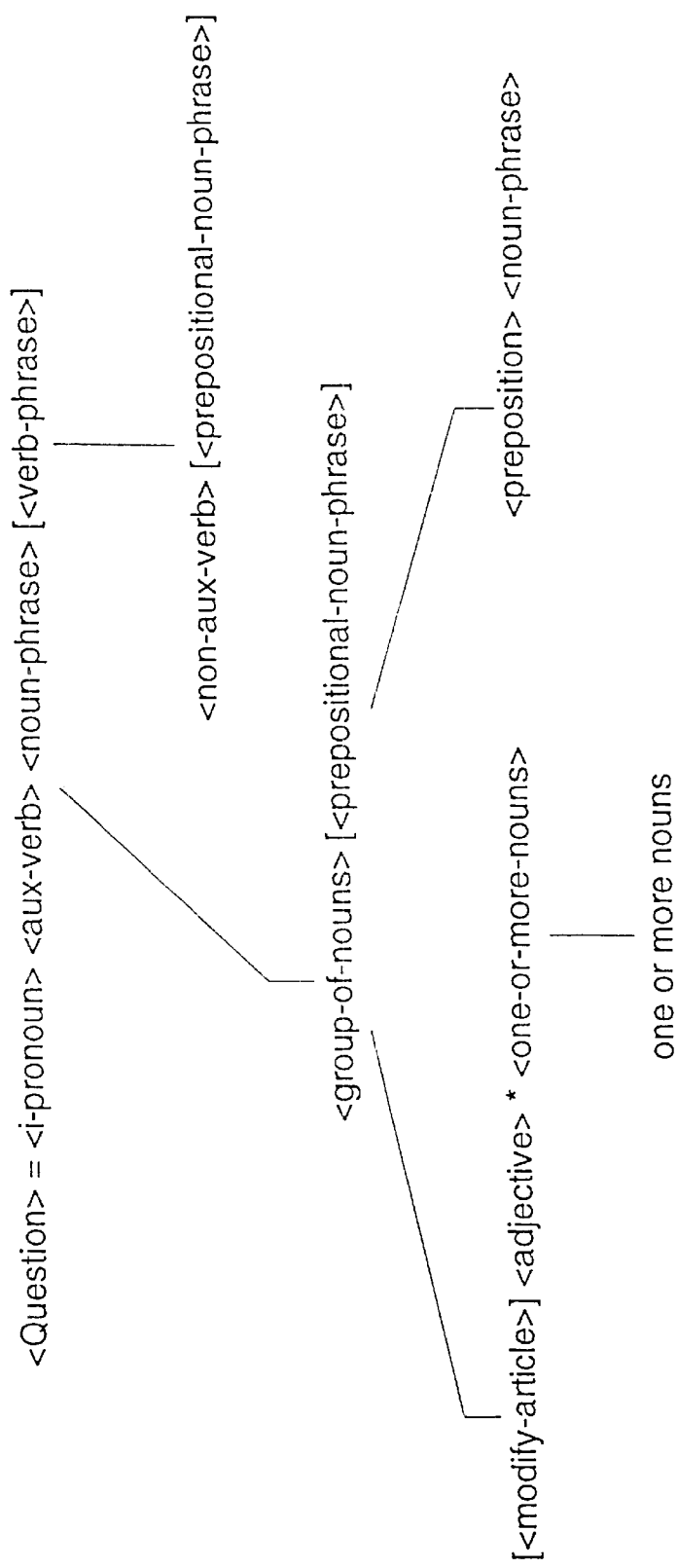
FIG. 7 shows a pre-defined context-free grammatical structure in the present invention.

In one embodiment, the pre-defined context-free grammatical structure is shown in FIG. 7 and is as follows:

<Question>=<i-pronoun><aux-verb><noun-phrase>
  [<verb-phrase>]

where: the symbols <> denote whatever inside is a meta-symbol, which has a grammatical meaning; the meta-symbol is not in the grammatical table.

The symbols [] denote whatever inside the bracket is optional.

<I-pronoun> denotes an interrogative pronoun which is a pronoun used in asking questions, and can be one of the following: what, when, where, who, whom, whose, which, and why.

<Aux-verb> denotes an auxiliary verb, and can be any form of the verb "to be," or "do."

<Noun-phrase> is defined as <group-of-nouns>
  [<prepositional-noun-phrase>]
  where: <group-of-nouns> is defined as:
  [<modify-article>] <adjective>*<one-or-more-nouns>;
    the symbol * denotes zero or more;
    <modify-article> is defined as a modified article, including a, an, the, this, these and those; and
    <one-or-more-nouns> denotes one or more nouns; and
  <prepositional-noun-phrase> is defined as a
    <preposition><noun-phrase>.

<Verb-phrase> denotes a non-aux-verb, and is defined as <non-aux-verb>[<prepositional-noun-phrase>].

<Preposition> denotes a preposition defined in the grammatical table.

<Non-aux-verb> denotes a verb defined in the grammatical table and is not an <aux-verb>.

<Noun> denotes a noun defined in the grammatical table.

<Adjective> denotes an adjective defined in the grammatical table.

The pre-defined structure is only one example to illustrate the present invention. Other context-free grammatical structures are applicable also. Generating different context-free grammatical structures should be obvious to those skilled in the art.

In the present invention, a word or a set of words that can fit into the structure of a meta-symbol is a grammatical component. For example, the phrase "with respect to x" is a grammatical component, whose grammatical meaning is a prepositional-noun-phrase.

In the present invention, grammatical rules and the pre-defined grammatical structures are linked. Once the rules are set, the structures are determined. Similarly, once the structures are determined, a set of rules can be found. For example, based on the pre-defined structures, one grammatical rule is that "a group-of-nouns preceding a prepositional-noun-phrase is a noun-phrase."

The grammatical table defines the grammatical meaning of each word. In one embodiment, the table is a part of the grammatical rules. In another embodiment, all the grammatical rules that define the grammatical meaning of each word are separated from the rest of the grammatical rules, and are grouped together to establish the grammatical table 114.

A number of examples on analyzing a question for parsing it into its grammatical components based on the pre-defined grammatical structure are:

1. What is the derivative of sin(x+4) with respect to x?
   Starting from the right hand side,
   (x) is a noun
   so (x) is a group-of-nouns
   so (x) is a noun-phrase
   so (with respect to x) is a prepositional-noun-phrase
   (sin(x+4)) is a noun
   so (sin(x+4)) is a group-of-nouns
   so (sin(x+4) with respect to x) is a <group-of-nouns><prepositional-noun-phrase>
   so (sin(x+4) with respect to x) is a noun-phrase
   so (of sin(x+4) with respect to x) is a prepositional-noun-phrase
   (derivative) is a noun
   (the) is a modify-article
   so (the derivative) is a group-of-nouns so (the derivative of sin(x+4) with respect to x) is a <group-of-nouns><prepositional-noun-phrase>
   (is) is an aux-verb
   (What) is an i-pronoun
   Thus, the question is of the structure
   <i-pronoun><aux-verb><group-of-nouns><prepositional-noun-phrase>.

2. Why is delta used in step 4 of the proof?
   Starting from the right:
   (proof) is a noun
   (the) is a modify-article
   so (the proof) is a group-of-nouns
   so (the proof) is a noun-phrase
   so (of the proof) is a prepositional-noun-phrase
   (4) is a noun
   (step) is a noun
   so (step 4) is a group-of-nouns
   so (step 4 of the proof is a <group-of-nouns><prepositional-noun-phrase>
   so (step 4 of the proof) is s noun-phrase
   so (in step 4 of the proof) is a prepositional-noun-phrase
   (used) is a verb as defined by the grammatical table
   so (used in step 4 of the proof) is a verb-phrase
   (delta) is a noun
   so (delta) is a group-of-nouns
   so (delta) is a noun-phrase
   (is) is an aux-verb
   (Why) is an i-pronoun
   Thus, again the question is of the structure
   <i-pronoun><aux-verb><noun-phrase><verb-phrase>.

3. Why did President Nixon resign?
   Starting from the right-hand side
   (resign) is a verb
   so (resign) is a verb-phrase
   (Nixon) is a noun
   (President) is a noun
   (President Nixon) is a one-or-more-nouns
   so (President Nixon) is a noun-phrase
   (did) is an aux-verb
   (Why) is an i-pronoun
   Thus, the question is of the structure
   <i-pronoun><aux-verb><noun-phrase><verb-phrase>

Many questions cannot be parsed based on the pre-defined context-free grammatical structure. In this disclosure, these questions are considered as ambiguous questions, and still be analyzed through methods explained later in this disclosure. If there are more than one such pre-defined context-free granmatical structure stored in the system, the question entered will be parsed based on each structure individually. The question only has to be successfully parsed based on one such structure. If the question cannot be parsed based on all the pre-defined context-free grammatical structures, the question will be considered as an ambiguous question.

Programming-steps Generator

The programming-steps generator 108 transforms at least one grammatical component of the question using a set of semantic rules and one or both of the semantic table to generate a set of instructions. The semantic rules and the semantic tables depend on the pre-defined context-free grammatical structure, which the parsing process bases on. In one embodiment, the semantic rules are also embedded in the semantic tables. In a general sense, the generator 108 directs different grammatical components in the question to algorithms or to data in the topic-related tables.

To help explain the present invention, a number of functions are created as shown in the following:

Keys-Of(Table)
  This function extracts all the key attributes in the identified table.
Attributes-Of(Table)
  This function extracts all the attribute names in the identified table.
Attribute-Names({adjective}, Table)
  This function identifies one or more attributes when the {adjective} is applied to the table.
Attribute-Names({noun}, Table)
  This function identifies one or more attributes when the {noun} is applied to the table.
Attribute-Name({i-pronoun}, Table)
  This function identifies the attribute when the {i-pronoun} is applied to the table.
Tables-Of({proper noun})
  This function identifies one or more tables that contain the {proper noun} as a key value. It can be derived by the following program:
  T-Names="";
  for Table in {all Tables}//{all Tables} is a list of topic-related tables
  do
     for Key in Keys-Of(Table)
     do
        if any value of the attribute Key in the Table contains {proper noun}
           then T-N Names=T-Names+Table
        endif
     endfor
  endfor
  return T-Names
Synonym({word})
  This function identifies the synonym corresponding to the word. The synonym can be found in the topic-independent-semantic table.

Methods to create the above functions should be obvious to those skilled in the art of programming.

Based on a number of semantic rules, the programming-steps generator 108 generates instructions based on the grammatical components in the question. The following shows examples of different instructions generated to illustrate the present inventions. The instructions generated are either in a SQL-like, a LISP-like or a C-like language though other programming languages are equally applicable.

A Proper Noun

A grammatical component in the question can be a proper noun, which implies that it has a grammatical meaning of a proper noun. One set of semantic rules is that the programming-steps generator 108 transforms the proper noun into instructions to select one or more topic-related tables, and then transforms other grammatical components in the question into instructions to select and to operate on data in the tables for answering the question.

Using the topic-dependent semantic table 118A, the programming-steps generator 108 first retrieves all tables where the proper noun is an attribute. Then, as shown in the topic-dependent semantic table, all key attributes in those tables are identified, and each of them is matched to the proper noun. The table of any key attribute that matches the proper noun is selected for additional operation by the remaining grammatical components in the question.

A proper noun may consist of more than one word, such as the "Bills of Right." A proper noun can be a lower-case word, such as "moon."

In one example, the corresponding instructions are as follows:

```
for Table in Table-Of({proper noun})
do
   for Key in Keys-Of(Table)
   do
      x=(SELECT . . .
         FROM Table
         WHERE Key MATCH {proper noun})
      // The above clause has the meaning of "where
         the key attribute
      // in the table matches the proper noun."
      if x is valid then done
      // if the SELECT function successfully identifies one
         or more attributes,
      // x is valid.
   endfor
endfor.
```

Common Nouns

One grammatical component in the question can be a common noun. The programming-steps generator 108 might transform the common noun into instructions to select a topic-related table, an attribute name, a synonym of an attribute name, the data under an attribute, or an algorithm.

Figure 8A:
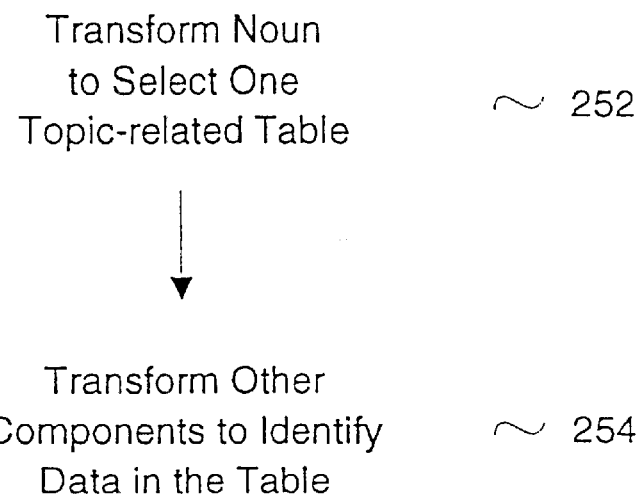
FIGS. 8A–B show examples of semantic rules applied to nouns in the present invention.

As shown in FIG. 8A, if the noun is the name of a topic-related table as shown by the topic-dependent semantic table 118A, then the programming-steps generator transforms the noun into instructions to select (Step 252) that topic-related table, and transforms (Step 254) other components in the question to identify data in the table and to operate on them, if necessary.

If the noun denotes an attribute name or a synonym of an attribute name, again as shown by the topic-dependent semantic table 118A, the programming-steps generator searches and identifies the attribute based on the noun. The instruction generated can be, for example, modifying a SELECT clause as follows

```
for Attribute in Attribute-Names({noun}, Table)
do
   SELECT Attribute from Table
   . . .
endfor
```

After all of the relevant attributes have been identified, data in them are retrieved for further processing by other parts of the question to generate an answer.

If the noun denotes the data under an attribute, the programming-steps generator identifies the data, with its corresponding attribute and table. The instructions generated can be, for example, (1) identifying each table in the function Tables-Of({noun}); (2) for each table identified, the function Attribute-Names({noun}, Table) returns the corresponding attributes containing the {noun} in that table; and (3) the remaining parts of the question operate on information under each attribute to generate the answer to the question. One set of instructions achieving such objectives is as follows.

```
for Table in Tables-Of({noun})
do
   for Attribute in Attribute-Names({noun}, Table)
   do
      SELECT. . .
         FROM Table
         WHERE Attribute={noun}
      . . .
   endfor
   . . .
endfor
```

Figure 8B:

As shown in FIG. 8B, the programming-steps generator might identify the algorithm (Step 262) corresponding to the noun; the algorithm is then applied (Step 264) to data selected by grammatical components in the question other than the common noun. For example the noun "sum" indicates accumulating results; the noun "count" indicates computing the cardinally of the results; and the noun "product" in mathematics indicates multiplying results. The topic-independent semantic table 118B can point to locations to get the algorithm.

A Group of Nouns

If the question includes a group of nouns linked together, such as X1 X2 X3 . . . Xn, then X1 to Xn−1 can modify, the final noun Xn, which is known as the primary noun. In other words, the programming-steps generator operates on the primary noun as a common noun, or a proper noun, whichever it may be, and the remaining nouns X1 to Xn−1 further operate on data/table(s) selected by the primary noun.

Non-Auxiliary Verbs

One grammatical component can be a non-auxiliary verb. It relates to one or more events or an action, which has a number of attributes; and it might have words with similar meaning. One approach is to identify the verbs with similar meaning. Then other components in the question identify data in the attributes of the identified verbs for answering the question.

A verb can be related to many different events. As an example, the verb is "nominate": one event can be President Bush being nominated to be the President, and another event can be President Clinton being nominated to be the President.

However, an event is related to a verb. The attributes of the event can have a subject-agent, which is the agent performing the event, such as the party nominating the president. Typically, the preceding noun phrase before the verb identifies the subject-agent. The event can have an object-agent if the verb is a transitive verb, which is the agent acted upon by the event, such as the president being nominated.

Each event has a duration that is between a starting and an ending time. For example, if the event is "walk," its duration starts with the sole of a foot changing its position from touching the ground to not touching the ground, and then ends with the sole back to touching the ground again.

Non-auxiliary verbs are grouped together in an event table, which is a topic-related table, with the topic being events. The following is an example of an event in the table:

```
CREATE TABLE EVENT (
    Verb_word       Character String NOT NULL,
                    //The verb that associates with the event
    Subject_Agent   Character    //Agent name performing the event
                    String,
    Object_Agent    Character    //Agent name acted upon by the
                    String,      //event
    Start_Time      Time,        //Starting time of event
    End_Time        Time,        //Ending time of event
    Description     Character    //Describes the event
                    String,
    KeyId           Integer,     //Unique number identifying the
                                 event
)
```

The subject-agent, object_agent etc. are attributes related to the verb_word, which is associated with an event.

There might be non-auxiliary verbs with similar meaning as the non-auxiliary verb in the question. These verbs can be identified by the synonym in the topic-independent semantic table. As an example, the verbs of breathe and inhale have similar meaning.

Figure 9:
FIG. 9 shows an example of semantic rules applied to a non-auxiliary verb in the present invention.

As shown in FIG. 9, the programming-steps generator 108 transforms the non-auxiliary verb in the question into one or more instructions, which select (Step 300) one or more verbs with their attributes in the event table. The one or more verbs have similar meaning as the non-auxiliary verb. Then other components in the question identify data (Step 302) in he attributes for answering the question. The selected verbs can be put into a temporary table or a view (a database terminology) as follows.

CREATE VIEW Verb_View({verb}) As
// View is a logical table that is created only when it is needed.
// All events matching {verb} are grouped from the event table
// to form the view.
SELECT*FROM EVENT
// here * denotes all of the attributes
WHERE Synonym({verb})=Verb_word;

The attributes of the selected verbs are also identified. Then, the programming-steps generator 108 generates additional instructions based on other components in the question to identify data (Step 302) in the selected attributes for answering the question.

Events might be related. Two events may form a sequential relationship, where one event follows another event, such as eat and drink. Two events may form a consequential relationship, such as braking and stopping, with the braking event causing the stopping event. Many small events may make up a big event, with the big event containing the small events; this leads to containment relationships. Also, events may be related because they involve the same subject-agent; and events may be related because they involve the same object-agent.

An event-relationship table describes relationships among events. It can have the following format:

```
CREATE TABLE EVENT_RELATIONSHIP (
    KeyId1       Integer,           //KeyId of an event
    KeyId2       Integer,           //KeyId of another event
    Relationship Character String,
        //Relationship, such as sequential, consequential, containment
        etc.
)
```

Interrogative Pronouns

Based on the interrogative pronoun in the question, the programming-steps generator 108 Generates one or more instructions to select one or more attributes in one or more tables. Those tables have been selected by grammatical components in the question other than the interrogative pronoun. The function Attribute-Name({i-pronoun}, Table) generates the attribute name corresponding to the {i-pronoun}.

One way to generate a SQL-like instruction corresponding to the {i-pronoun} is to modify a SELECT clause:
    SELECT Attribute-Name({i-pronoun}, Table) FROM Table Determiners Examples of a set of semantic rules on determiners are:
If the determiner is "a" or "an", select any result from the previous query.
If the determiner is "some", select more than one result from the previous query. If the previous query yields only one result, that result will be selected.
If the determiner is "all", select all result from the previous query.
If the determiner is "the", modify the following SELECT function with DISTINCT, as will be shown by examples below.

Auxiliary Verbs

An auxiliary verb together with either its immediate noun phrase or a non-auxiliary verb determine whether the answer should be singular or plural.

Adjectives

Figure 10:
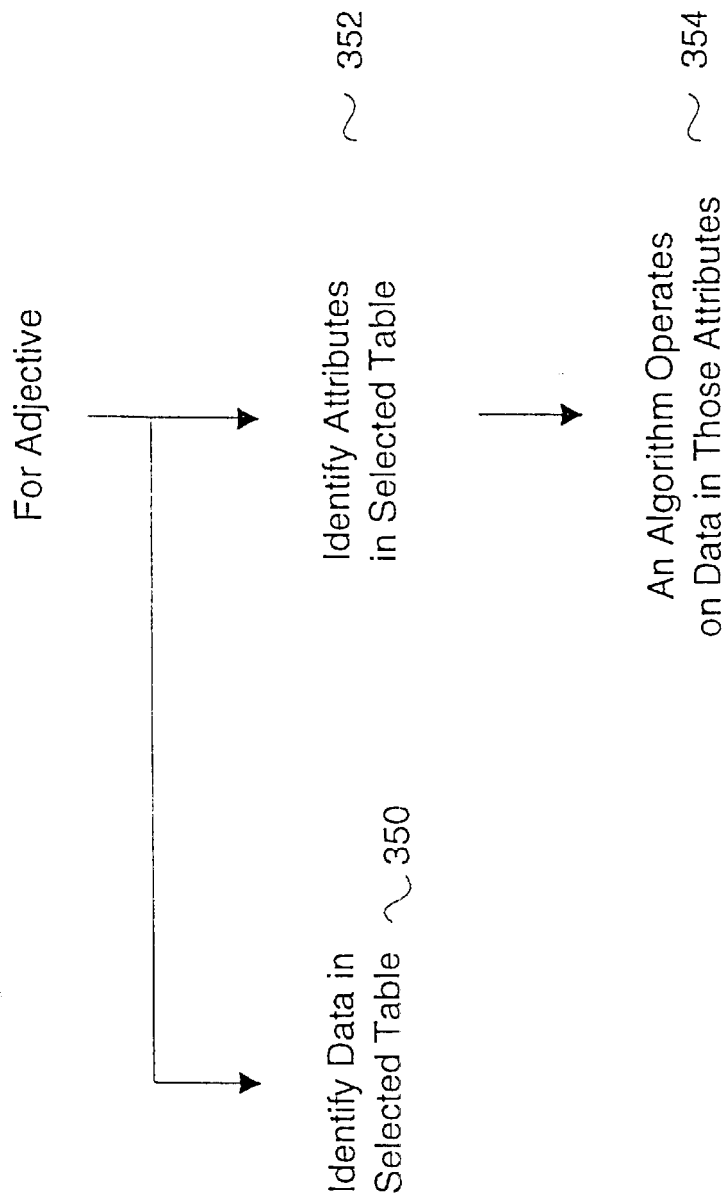
FIG. 10 shows examples of semantic rules applied to adjectives in the present invention.

One grammatical component of the question can be an adjective. As shown in FIG. 10, based on the adjective, the programming-steps generator either identifies the value of an attribute, or identifies an algorithm. The grammatical components in the question other than the adjective have already selected one or more topic-related tables.

As shown by the topic-independent semantic table, the adjective may identify (Step 350) an attribute. The function Attribute-Names({adjective}, table) can retrieve the attribute in the table previously selected. The corresponding instruction can be:

for Attribute in Attribute-Names({adjective}, Table)
do
    SELECT . . .
    FROM Table
    WHERE Attribute={adjective}
    // or "Where the attribute in the table is equal to the adjective."
    . . .
endfor As an example, the noun phrase is "a red apple." The noun "apple" can be associated with a table known as FRUIT, and the Attribute-Names(red, FRUIT) yield the attribute "color." The adjective "red" is interpreted:
    WHERE color="red."

If there is a sequence of such adjectives, all of them can apply to the same table. The WHERE clause would be a conjunction of the adjectives, such as:

WHERE
   for Attribute1 in Attribute-Names({adjective1}, Table)
   do
     for Attribute2 in Attribute-Names({adjective2}, Table)
     do
       SELECT . . .
          FROM Table
          WHERE Attribute1={adjective1}
          and Attribute2={adjective2}
     endfor
   endfor An adjective can refer to an algorithm, as identified by the topic-independent semantic table. Grammatical components in the question other than the component that is the adjective have selected one or more topic-related tables. As shown in the topic-independent semantic table, the adjective identifies (Step 352) one or more attributes in those tables. Then the algorithm operates (Step 354) on one or more data in those attributes.

As an example, the adjective is "first." The topic-independent semantic table indicates that the adjective is an algorithm sorting a list of data in ascending order; the table also identifies the data in one or more attributes in one or more topic-related tables. For each attribute identified, after sorting its data, the first value will be the result. For example, the question is "Who is the first President" The table identified is the President table. The attribute whose data are to be sorted is the "date" attribute, which identifies the time each President was elected. The instruction corresponding to the adjective "first" can be as follows:

for Attribute in Attribute-Names(first, Table)
   do
     SELECT . . .
       FROM Table
       ORDER BY Attribute ASC
     . . .
   endfor The symbol ASC denotes ascending.

Similarly, if the adjective is "last," then the attribute whose data are ordered is the same, but the data are sorted in a descending manner. The corresponding instruction can be as follows:

for Attribute in Attribute-Names(last, Table)
   do
     SELECT . . .
       FROM Table
       ORDER BY Attribute DESC
     . . .
   endfor The symbol DESC denotes descending.

Another example on adjective is the word, "immediate." Its interpretation depends on the word it modifies. In one example, if the word modified is "action," the word "immediate" has the same effect as the word, "first;" if the word modified is "cause," the word "immediate" has the same effect as the word "last."

There can be a sequence of adjectives. Then, the above analysis is applied in the same order as the occurrence of the adjectives.

Preposition

One grammatical component can be a preposition. A preposition can modify its previous noun phrase or verb, such as by operating on them through an algorithm identified in the topic-independent semantic table. Under some situations, with one or more tables selected by at least one grammatical component in the question other than the component that is the preposition, the algorithm identified operates on data or values in the one or more selected tables.

Under some other situations, for example, due to the prepositions 'of' and 'in', the programming-steps generator processes the grammatical component succeeding the preposition before the grammatical component preceding.

For another example, the preposition 'before' can modify the WHERE clause with a comparison on time:

{time of preceding event}<{time of succeeding event}

Programming-Steps Executor

The executor 112 executes at least one set of instructions generated from one grammatical component to at least access data from the database to generate an answer for the question, if there is one.

In one embodiment, after the programming-steps generator 108 generates a set of instructions, the programming-steps executor 112 executes them. The set may be generated from one grammatical component. This process repeats until all sets are generated and executed to answer the question. For at least one set of instructions, the executor 112 accesses data from one or more topic-related tables identified by the instructions. In another embodiment, all the instructions are generated; then the program executor 112 runs the instructions, which include accessing data from one or more topic-related tables identified by the instructions, and processing those data for generating the answer to the natural-language question.

In the appendix, there are a number of examples of instructions illustrating the present invention. They generated to answer different types of grammatically-context-free questions.

Ambiguous Questions

In the present invention, the grammatical structure analyzer 102 may decide that the natural-language question cannot be parsed into grammatical components based on the pre-defined context-free grammatical structure. For example, the grammatical components of the question cannot fit into the pre-defined structure. Then the question is considered ambiguous, and an answer cannot be generated.

Figure 11:
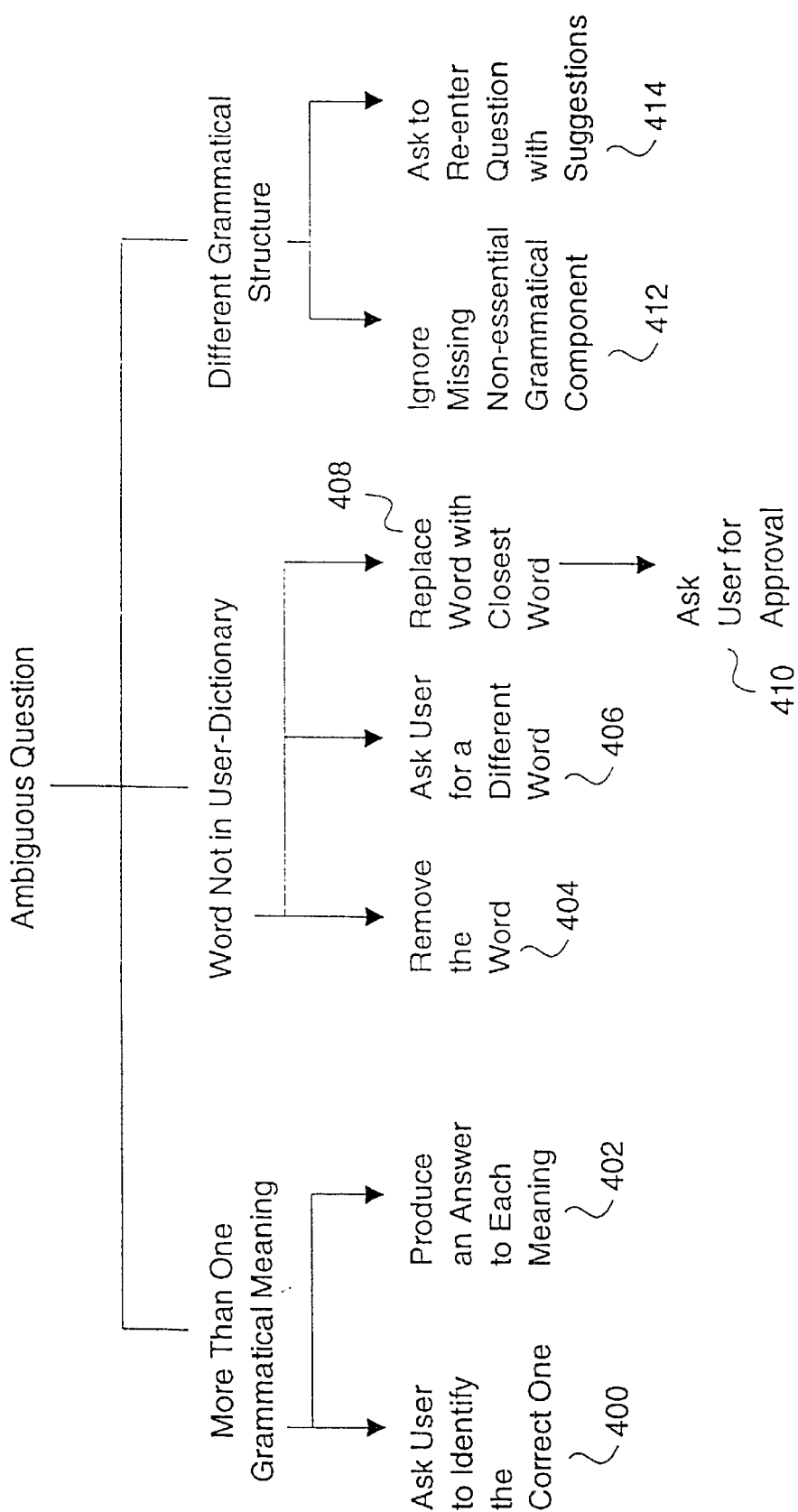
FIG. 11 shows different approaches to resolve ambiguous question in the present invention.

Ambiguity may be due to a number of reasons. For example, the question may contain words with non-unique grammatical meaning the question may contain words not in the grammatical table, or the grammatical structure of the question is different from the pre-defined grammatical structure. FIG. 11 shows different approaches to resolve the ambiguity.

The grammatical structure analyzer can decide that a word can be of more than one grammatical meaning, such as it can be a noun and a verb. In one embodiment, the analyzer produces (Step 402) an answer for each meaning and ignores those meaning with no answer. In another embodiment, the analyzer asks (Step 400) the user to identify the correct grammatical meaning.

For example, the question is: "When was the Persian Gulf war?" The word "war" can be a noun or a verb. In one embodiment, the analyzer asks the user whether the word "war" is a noun or a verb. Based on the user's response, the question is analyzed. In another embodiment, the analyzer generates answers to both the question that treats the word "war" as a verb, and the question that treats the word "war" as a noun. Both answers, if available, are presented to the user.

If the grammatical structure analyzer decides that the question contains one or more words not in the grammatical table, in one embodiment, the analyzer removes (Step 404) the un-recognized word and processes the remaining words in the question. In another embodiment, the analyzer asks (Step 406) the user for a different word. The analyzer might assume that the word is miss-spelled, and ask the user to correct it; the analyzer might replace (Step 408) the un-recognized word with a word in the grammatical table most similar to or with minimum number of different characters from the un-recognized word. The analyzer then presents (step 410) the matched word to the user to ask if that is the right word. A list of matched words may be presented for the user to select.

For example, the question is: "What exactly are the Bills of Right?" The word "exactly" is an adverb and is not in the grammatical table. The word is dropped, and the question, satisfying the grammatical structure, is analyzed. In another example, the question is: "What is the Bill of Right?" Here, the "Bill of Right" should be the "Bills of Right." The analyzer can ask the user to spell the "Bill of Right" again; or the analyzer can find the term closest in spelling to the un-recognized term, and identify the term to be the "Bills of Right". The identified word is presented to the user to ask if that is the right spelling.

In the present invention, the grammatical structure of the question entered may be different from the one or more pre-defined context-free grammatical structures in the system.

In one embodiment, a non-essential grammatical component is missing from the question. A grammatical component is non-essential if that grammatical component can be removed from the question without changing the answer to the question. For example, an auxiliary verb in certain condition can be non-essential. One approach to solve this problem is to ignore (Step 412) the missing grammatical component in generating the answer to the question. Another approach is to add the missing non-essential grammatical component back into the question, and present to the user asking if that is correct. For example, the question is: "When President Nixon resign?" An auxiliary verb is expected after the word "When"; such a word is entered into the question, which is then submitted to the user for approval.

In another embodiment, the user is suggested to re-enter (Step 414) the question with advice as to the appropriate question structure. One advice is to ask the user to re-enter the question based on the pre-defined structure, such as using one of the i-pronouns in the pre-defined grammatical structure. This can be done, for example, by citing a list of acceptable i-pronouns, and a list of model questions using the i-pronouns as examples. Another advice is to identify nouns and non-auxiliary verbs, if any, in the question, and to ask the user which of the identified word or words he wants to know more about. Then it would be up to the user to select the one he wants. In a farther embodiment, the identified word or words are fit into alternative grammatical structures, and the user is asked to select one structure out of the list of suggested structures.

As an example, the question is: "Do you know when President Nixon resign?" Assume that such a question does not fit the pre-defined grammatical structure. The user is suggested to re-enter the question using one of the following i-pronouns: What, when, where, why and who. In another embodiment, the noun and the auxiliary verb are identified, and they are "President Nixon resign." The user is asked, "You want to know about President Nixon resign?" In yet another embodiment, the identified words are fit into the following question formats, and it would be up to the user to select one, for example:

What does President Nixon resign?
When does President Nixon resign?
Where does President Nixon resign?
Why does President Nixon resign?
Who does President Nixon resign?

As another example, the question is: "Is there a reason why President Clinton sent troops to Bosnia?" Assume that the question does not fit the pre-defined grammatical structure. In one embodiment, the user is suggested to re-enter the question using one of the i-pronouns in the pre-defined grammatical structure. In another embodiment, the nouns and the non-auxiliary verbs, "President Clinton", "troops" "send" and "Bosnia" are identified. Then the user is asked to select one or more of the following questions:

Do you want to know about President Clinton?
Do you want to know about troops?
Do you want to know about Bosnia?

Also, the answer generator 100 can present suggestions to the user on ways to rephrase the original question based on the noun and the non-auxiliary verbs. It would then be up to the user to select the one he wants.

In certain situation, the present invention does not have any answer. As an example, the grammatical table does not have some essential terms X in the question. Then, the present invention can return the following message:

Sorry, I do not know anything about X. You may want to check with your instructor. If you wish, I will inform your instructor your question. {Click here to inform your teacher}

If the user clicks at the designated area, his last question will be automatically sent as an electronic mail to an instructor who can answer the user directly. This instructor may be previously selected by the user, or the guardian of the user.

Questions Matching Engine

The embodiment shown in FIG. 2 can answer an infinite number of questions.

Figure 12:
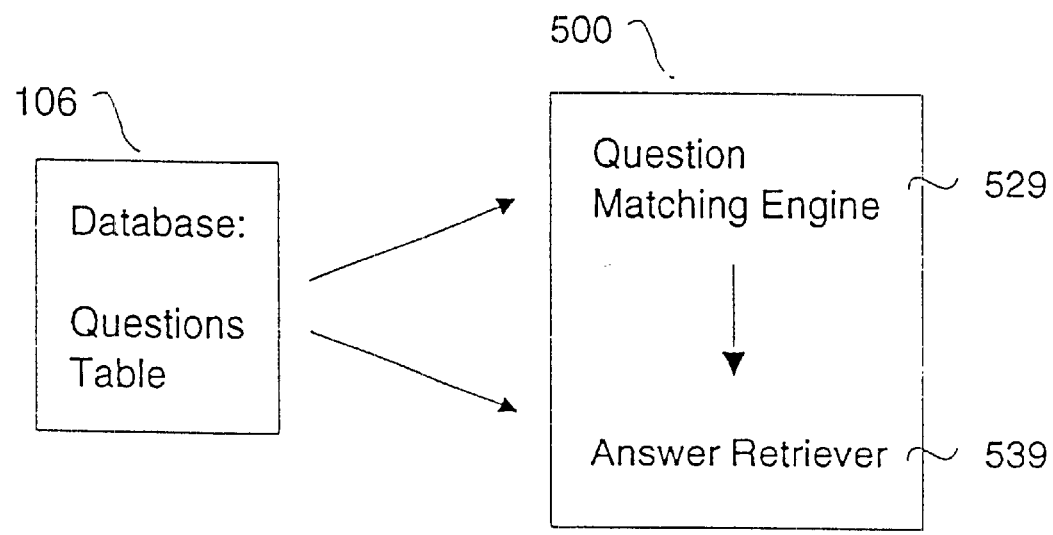
FIG. 12 shows another embodiment of the answer generator in the present invention.

FIG. 12 illustrates another embodiment 500 of the answer generator, which provides answers to a finite number of questions, but requires fewer steps to generate answers as compared to the embodiment shown in FIG. 2. Also, the answer generator 500 can answer non-natural-language questions, and grammatically-context-t-dependent questions. In this embodiment, the database 106 includes a questions table, which contains many questions, each with its corresponding answer. A question matching engine 529 compares the question entered with questions in the database. An answer retriever 539 retrieves the answer to the question in the database that matches the entered question.

FIG. 13 shows one set of steps 550 for the present embodiment. The question matching engine 529 compares (Step 552) the entered question with questions in the database 106. If there is a match with any one of them, the answer retriever 639 retrieves (Step 54) the answer corresponding to the matched question. If no question in the table matches the input question, the answer generator 500 might use one of the approaches discussed in the ambiguous questions section to answer the question.

In another embodiment, the question entered is a natural-language question. The matching engine 529 compares the grammatical components of the natural language question with components of the questions in the database 106.

A further embodiment includes an essential-components extractor, which extracts essential components from the natural-language question entered. Only essential components are compared with the pre-stored questions, which have essential components. If there is a match, the answer to the corresponding matched question is retrieved and is presented to the student. As an example, an auxiliary verb is a non-essential components. The extractor strips off the auxiliary verb from the question to allow the matching engine 529 to compare the rest of the components.

In yet another embodiment, the question entered is a grammatically context-free question.

The answer generator 100 shown in FIG. 2 can be combined with the answer generator 500 shown in FIG. 12. The question entered is first analyzed by the answer generator 100 shown in FIG. 2. If the question cannot be parsed into its grammatical components based on the pre-defined structure, then the question is passed to the answer generator 500 shown in FIG. 12. If that answer generator also cannot find a match in the questions table, the question will be considered as an ambiguous question to be resolved by approaches discussed in the ambiguous questions section.

Question Comparator

In one embodiment, the comparator 60 compares the question just entered with one or more questions previously entered by the user to determine his understanding level in the subject. This can be done for example by the comparator 60 comparing the grammatical components of the questions. In one embodiment, non-essential components are de-emphasized. Two questions are considered identical if their essential components are identical. Words are considered identical to its synonyms, as defined by the topic-independent-semantic table in the database. If the user has asked the same question more than once, his understanding level is low in the areas covered by the question. The more times he asked the same question, the less he understands the area covered by the question.

In another embodiment, the comparator 60 counts the total number of occurrence of every interrogative pronoun, every noun and every non-auxiliary verb in the question just asked based on all the questions he previously asked. If the questions are:

Just entered: What is the derivative of sin(x+4) with respect to x?

Previously asked: What is the derivative of cos(2*x)*sin (x+4) with respect to x?

the comparator 60 has the following word counts:

what: twice, derivative: twice, sin: twice, x: 4 times.

The noun x is known as an indeterminant, which is a non-essential word; it is not essential to determine his understanding level. In one embodiment, they are ignored in word counts.

If the questions are:

Just asked: When did President Clinton become president?

Previously asked: How many terms have President Clinton served?

the comparator 60 has the following word counts:

When: once,

President Clinton: twice, president: once, become: once.

There is also a question count for the question just asked. That count sums the word counts of the words in the question, and divides that sum by the number of essential words in the question:

Question count=Sum (Word counts)/(# of essential words in the question)

The division normalizes the question count.

Based on the above metrics, the user's understanding level in the area covered by the question is low if the question has a high question count.

In another embodiment, the word count and the question count also consider time as a factor. The user might have asked a question similar to one he just asked long time ago. In order for the word count and the question count to reflect his degree of forgetfulness, the system uses an effective word count, an effective question count, and time-stamps. The effective word count adjusts the word count by a time factor. One equation for the effective word count of a word is:

Effective word count=1+(word count)*c/exp(Current-time-stamp−Last-time-stamp), where:

c is a positive constant between 0 and 1;

exp is the exponential function, time-stamps are measured in units of time,
 such as every ten minutes is one unit,
 but with the units removed in the equation;

current-time-stamp denotes the time
 when the user just asked the question with the word; and last-time-stamp denotes the time
 when the user asked a question with the word immediately before the current-time-stamp.

The effective question count sums the effective word counts of the essential words in the question, and divides that sum by the number of essential words in the question.

Effective question count=Sum (Effective word counts)/(# of essential words in the question)

The division normalizes the effective question count.

Again, based on the above metrics, the user's understanding level in the area covered by the question is low if the question has a high effective question count.

In a further embodiment, the comparator 60 also includes a word-significance table, which indicates the significance of words used in a question. Every word in the subject has a significance factor ranging from 0 to 1. For example, the non-essential components, just like the indeterminants in mathematics, have a significance factor of 0; and the interrogative pronoun "why" has a higher significance factor relative to the interrogative pronoun "what." In one embodiment, before the comparator 60 sums the word counts to generate the question counts, each word count is multiplied by its corresponding significance factor.

In another embodiment, based on the magnitude of the question count, the comparator 60 may test the user. The test results further indicate the user's understanding level in areas covered by the question. Generating a test in a certain area should be obvious to those skilled in the art and will not be further described.

In yet another embodiment, based on the user's understanding level, the comparator 60 sends a message to the study-materials generator 52 to retrieve study materials for him. In one approach, the less he understands a certain area, the more detailed is the study materials to be presented to him. In another approach, the less he understands a certain area, the lower the level of difficulty is the study materials to be presented to him. For example, if the user is very weak in fractions, then the presenter 120 presents study materials on level 1 of fractions to him. Generating and retrieving study materials with different degrees of difficulties and different amount of detail should be obvious to those skilled in the art, and will not be further described.

If the user still asks the same question after the system has presented to him detailed study materials, the answer generator 100 may ask him to consult an instructor. In one embodiment, the database 106 contains a list of instructors for different areas of the subject. With permission from the user, the answer generator 100 may contact one or more instructors through electronic mail or other means, with the question sent to the instructor. The instructor can contact the user directly.

After reading the answer to his question, the user might ask another question, and the process of answering question repeats.

Filling Gaps of Misunderstanding

Figure 14:
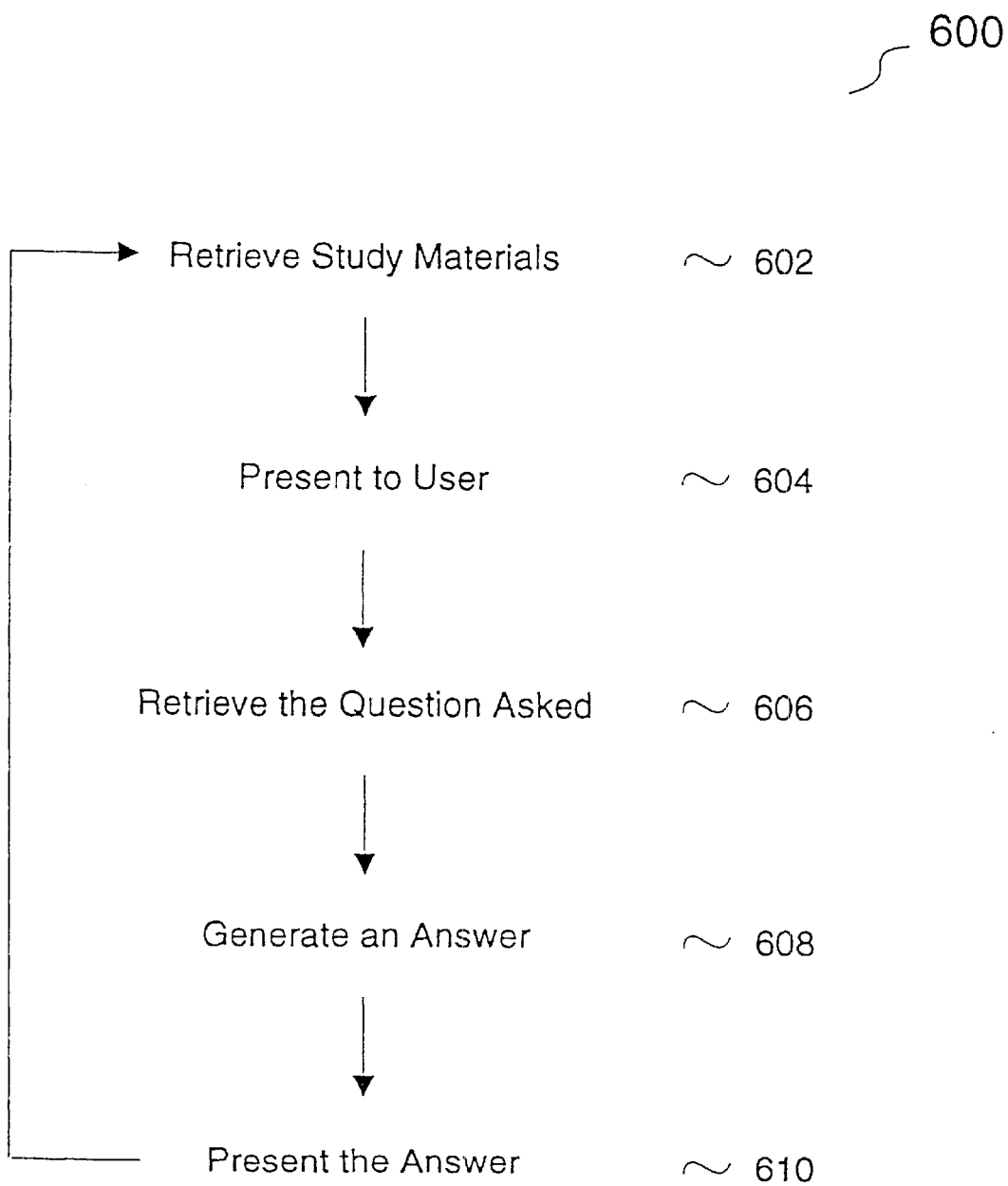
FIG. 14 shows a set of steps to fill gaps of misunderstanding in the present invention.

This invention is also applicable to filling gaps of misunderstanding when the user is working on a subject. FIG. 14 shows one such embodiment 600. First, the system 50 generates (Step 602) study materials on a subject, and presents (Step 604) the study materials to him. The subject can be a novel he wants to read on the system. The novel may have many individuals. He gets confused on their names, and begins to lose interest in the novel. Clarifying the identities might revive his interest in the novel. Similarly, the subject can be finance, and he forgets the meaning of a term, such as capital asset pricing model. He can ask the system a question. The system 50 retrieves (Step 606) the question entered, and generates (Step 608) an answer to the question. The presenter 120 presents (Step 610) the answer to him. Filling gaps of misunderstanding is very important in learning. Typically, the user gets confused and loses interest in the study materials as misunderstanding increases. After the system has answered his question, the process repeats with the system 50 generating study materials for the user. In one embodiment, the process continues until the user has mastered the entire subject.

In one embodiment, after working on the subject for some time, the user stops. The database stores the time he stops, with his identity, and the location where he terminates learning the subject. Next time, when the users enters the answer generator 100 to learn the same subject again, the answer generator 100 re-starts the process from where he ended last time. In another embodiment, the answer generator 100 asks him if he wants to re-start from where he ended or to re-start from another part of the subject. It would be up to him to decide.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. A computer-implemented method for providing a user with information, said method comprising:

sending informational materials from a server system to a client system via the Internet so as to inform a user of the client system about a subject;

subsequently receiving, at the server system, a request to respond to a natural-language question asked by the user, the natural language question being asked by the user at the client system, and the natural language question being associated with the subject;

determining, at the server system, a response to the natural-language question, said determining operating to at least analyze the natural-language question using at least grammatical and semantic processing; and sending the response to the natural-language question from the server system to the client system via the Internet;

wherein the subject relates to a product that the user is interested in.

2. A computer-implemented method as recited in claim 1, wherein said method further comprises:

identifying additional informational materials related to the natural-language question; and sending the additional informational materials from the server system to the client system via the Internet.

3. A computer-implemented method as recited in claim 2, wherein said sending of the additional informational materials is performed when requested by the user.

4. A computer-implemented method as recited in claim 2, wherein said sending of the additional informational materials is automatically performed substantially simultaneous with said sending of the response.

5. A computer-implemented method as recited in claim 1, wherein the grammatical and semantic processing uses at least one grammatical rule and at least one semantic rule.

6. A computer-implemented method as recited in claim 1, wherein said method further comprises:

receiving a referral request from the user requesting that the natural language question be referred to a human representative; and enabling a human representative to respond to the natural language question.

7. A computer-implemented method as recited in claim 6, wherein the natural language question is sent to the human representative without the need for the user to re-enter the question into the client system.

8. A computer-implemented method as recited in claim 6, wherein the human representative is specifically for the subject, and a different human representative may be enabled for a different subject.

9. A computer-implemented method as recited in claim 1, wherein said method further comprises:

referring the natural language question to a human representative to respond to the natural language question.

10. A computer-implemented method as recited in claim 9, wherein the natural language question is sent to the human representative without the need for the user to re-enter the question into the client system.

11. A computer-implemented method as recited in claim 9, wherein the human representative is specifically for the subject, and a different human representative may be enabled for a different subject.

12. A computer-implemented method as recited in claim 1, wherein said method further comprises:

determining whether clarification of the natural language question is desirable; and prompting the user to clarify the natural language question when clarification of the natural language question is determined to be desirable.

13. A computer-implemented method as recited in claim 12, wherein the user is asked one or more questions when prompting the user to clarify.

14. A computer-implemented method as recited in claim 1, wherein said method further comprises:

sending at least two questions to the client system; and receiving, at the server system, at least an indication of a selection by the user of one of the questions sent by the server system to be responded.

15. A computer-implemented method as recited in claim 1, wherein the response is an answer to the natural-language question.

16. A computer-implemented method as recited in claim 1, wherein said determining operates to transform at least a portion of the natural-language question into at least one instruction.

17. A computer-implemented method as recited in claim 16, wherein the server system has an information database coupled thereto, and wherein the instruction is a query for the database.

18. A computer-implemented method as recited in claim 1, wherein said determining is independent of at least one word in the natural-language question, and the response depends on a correct spelling of at least one misspelled word in the natural-language question.

19. A computer-implemented method as recited in claim 1, wherein the subject relates to a product the user is interested in obtaining.

20. A computer-implemented method as recited in claim 1, wherein the subject relates to a product the user is interested in using.

21. A computer-implemented method as recited in claim 1, wherein said method further comprises having at least a second response available for the user, and allowing the user to select one or more of the responses for the natural-language question.

22. A computer-implemented method as recited in claim 1, wherein said determining produces a plurality of responses, and
wherein said sending operates to send the plurality of responses from the server system to the client system.

23. A computer-implemented method as recited in claim 22, wherein at least one of the responses is a question.

24. A computer-implemented method as recited in claim 22, wherein said method further comprises:
selecting one of the plurality of responses for which a further response is desired.

25. A computer-implemented method as recited in claim 24, wherein at least one of the responses is a question.

26. A computer-implemented method as recited in claim 1, wherein said method further comprises considering at least one additional input entered by the user in determining the response.

27. A computer-implemented method as recited in claim 26, wherein the additional input is a response to an inquiry from the server system.

28. A computer-implemented method as recited in claim 27, wherein the additional input is for clarifying the natural language question.

29. A computer-implemented method as recited in claim 26, wherein the additional input is also a question from the user.

30. A computer-implemented method as recited in claim 1, wherein the server system keeps track of a unique identifier of the user.

31. A computer-implemented method as recited in claim 1, wherein said method further comprises:
adapting in real-time to respond to questions by considering at least one additional input.

32. A computer-implemented method for providing a user with information, said method comprising:
sending informational materials from a server system to a client system via the Internet so as to inform a user of the client system about a subject;
subsequently receiving, at the server system, a request to respond to a natural-language question asked by the user, the natural language question being asked by the user at the client system, and the natural language question being associated with the subject;
determining, at the server system, a response to the natural-language question, said determining operating to at least analyze the natural-language question using at least grammatical and semantic processing;
sending the response to the natural-language question from the server system to the client system via the Internet;
receiving a referral request from the user requesting that the natural language question be referred to a human representative; and
enabling a human representative to respond to the natural language question,
wherein the subject relates to a product that the user is interested in using.

33. A computer-implemented method as recited in claim 32, wherein said method further comprises having at least a second response available for the user, and allowing the user to select one or more of the responses for the natural-language question.

34. A computer-implemented method as recited in claim 32, wherein said determining is independent of at least one word in the natural-language question, and the response depends on a correct spelling of at least one misspelled word in the natural-language question.

35. A computer-implemented method as recited in claim 32, wherein said determining operates to transform at least a portion of the natural-language question into at least one instruction.

36. A computer-implemented method as recited in claim 35, wherein the server system has an information database coupled thereto, and wherein the instruction is a query for the database.

37. A computer-implemented method as recited in claim 32, wherein said method further comprises:
sending at least two questions to the client system, and
receiving, at the server system, at least an indication of a selection by the user of one of the questions sent by the server system to be utilized as the natural language question being asked by the user.

38. A computer-implemented method as recited in claim 32, wherein said method further comprises considering at least one additional input entered by the user in determining the response.

39. A computer-implemented method as recited in claim 38, wherein the additional input is a response to an inquiry from the server system.

40. A computer-implemented method as recited in claim 38, wherein the additional input is also a question from the user.

41. A computer-implemented method as recited in claim 32, wherein the server system keeps track of a unique identifier of the user.

42. A computer-implemented method for providing a user with information, said method comprising:
sending informational materials from a server system to a client system via the Internet so as to inform a user of the client system about a subject;
subsequently receiving, at the server system, a request to respond to a natural-language question asked by the user, the natural language question being asked by the user at the client system, and the natural language question being associated with the subject;
determining, at the server system, a response to the natural-language question, said determining operating to at least analyze the natural-language question using at least grammatical and semantic processing;
sending the response to the natural-language question from the server system to the client system via the Internet;
identifying additional informational materials related to the natural-language question; and sending the additional informational materials from the server system to the client system via the Internet, wherein the subject relates to a product that the user is interested in using.

43. A computer-implemented method as recited in claim 42, wherein said sending of the additional informational materials is automatically performed substantially simultaneous with said sending of the response.

44. A computer-implemented method as recited in claim 42, wherein said method further comprises considering at least one additional input entered by the user in determining the response.

45. A computer-implemented method as recited in claim 44, wherein the additional input is a response to an inquiry from the server system.

46. A computer-implemented method as recited in claim 44, wherein the additional input is also a question from the user.

47. A computer-implemented method as recited in claim 42, wherein the server system keeps track of a unique identifier of the user.

48. A computer-implemented method as recited in claim 42, wherein said method further comprises:

sending at least two questions to the client system, and receiving, at the server system, at least an indication of a selection by the user of one of the questions sent by the server system to be utilized as the natural language question being asked by the user.

49. A computer-implemented method as recited in claim 42, wherein said method further comprises:

receiving a referral request from the user requesting that the natural language question be referred to a human representative; and enabling a human representative to respond to the natural language question.

50. A computer-implemented method as recited in claim 49, wherein the natural language question is sent to the human representative without the need for the user to re-enter the question into the client system.

51. A computer-implemented method as recited in claim 49, wherein the human representative is specifically for the subject, and a different human representative may be enabled for a different subject.

52. A computer-implemented method as recited in claim 42, wherein said method further comprises:

referring the natural language question to a human representative to respond to the natural language question.

53. A computer-implemented method as recited in claim 42, wherein said determining operates to transform at least a portion of the natural-language question into at least one instruction.

54. A computer-implemented method as recited in claim 53, wherein the server system has an information database coupled thereto, and wherein the instruction is a query for the database.

55. A computer-implemented method as recited in claim 42, wherein said determining is independent of at least one word in the natural-language question, and the response depends on a correct spelling of at least one misspelled word in the natural-language question.

56. A computer-implemented method as recited in claim 42, wherein said method further comprises having at least a second response available for the user, and allowing the user to select one or more of the responses for the natural-language question.

57. A computer-implemented method for providing a user with information, said method comprising:

sending informational materials from a server system to a client system via the Internet so as to inform a user of the client system about a subject;

subsequently receiving, at the server system, a request to respond to a natural-language question asked by the user, the natural language question being asked by the user at the client system, and the natural language question being associated with the subject;

determining, at the server system, a response to the natural-language question, said determining operating to at least analyze the natural-language question using at least grammatical and semantic processing;

sending the response to the natural-language question from the server system to the client system via the Internet so as to inform the user about the subject;

identifying additional informational materials related to the natural-language question;

sending the additional informational materials from the server system to the client system via the Internet;

receiving a referral request from the user requesting that the natural language question be referred to a human representative; and enabling a human representative to respond to the natural language question, wherein the subject relates to a product that the user is interested in obtaining, wherein said method further comprises having at least a second response available for the user, and allowing the user to select one or more of the responses for the natural-language question, wherein said determining is independent of at least one word in the natural-language question, and the response depends on a correct spelling of at least one misspelled word in the natural-language question, and wherein said determining operates to transform at least a portion of the natural-language question into at least one instruction.

58. A computer-implemented method as recited in claim 57, wherein the server system has an information database coupled thereto, and wherein the instruction is a query for the database.

59. A computer-implemented method as recited in claim 57, wherein said method further comprises:

sending at least two questions to the client system; and receiving, at the server system, at least an indication of a selection by the user of one of the questions sent by the server system to be utilized as the natural language question being asked by the user.

60. A computer-implemented method as recited in claim 57, wherein said method further comprises considering at least one additional input entered by the user in determining the response.

61. A computer-implemented method for providing a user with information, said method comprising:

sending informational materials from a server system to a client system via the Internet so as to inform a user of the client system about a subject;

subsequently receiving, at the server system, a request to respond to a natural-language question asked by the user, the natural language question being asked by the user at the client system, and the natural language question being associated with the subject;

determining, at the server system, a response to the natural-language question, said determining operating to at least analyze the natural-language question using at least grammatical and semantic processing;

sending the response to the natural-language question from the server system to the client system via the Internet so as to inform the user about the subject;

identifying additional informational materials related to the natural-language question;

sending the additional informational materials from the server system to the client system via the Internet;

receiving a referral request from the user requesting that the natural language question be referred to a human representative; and enabling a human representative to respond to the natural language question, wherein the subject relates to a product that the user is interested in obtaining, wherein said determining operates to transform at least a portion of the natural-language question into at least one instruction, and wherein said method further comprises considering at least one additional input entered by the user in determining the response.

62. A computer-implemented method as recited in claim 61, wherein the additional input is a response to an inquiry from the server system.

63. A computer-implemented method as recited in claim 61, wherein the additional input is also a question from the user.

64. A computer-implemented method as recited in claim 61, wherein the server system keeps track of a unique identifier of the user.

65. A computer-implemented method as recited in claim 61, wherein said subsequently receiving of the request pertains to receiving at least an indication of a selection by the user of one question to be utilized as the natural language question from at least two questions presented to the user.

66. A computer-implemented method as recited in claim 61, wherein said method further comprises:

sending at least two questions to the client system; and receiving, at the server system, at least an indication of a selection by the user of one of the questions sent by the server system to be responded.

67. A computer-implemented method as recited in claim 61, wherein the server system has an information database coupled thereto, and wherein the instruction is a query for the database.

68. A computer-implemented method for providing a user with information, said method comprising:

sending informational materials from a server system to a client system via the Internet so as to inform a user of the client system about a subject;

subsequently receiving, at the server system, a request to respond to a natural-language question asked by the user, the natural language question being asked by the user at the client system, and the natural language question being associated with the subject;

determining, at the server system, a response to the natural-language question, said determining operating to at least analyze the natural-language question using at least grammatical and semantic processing;

sending the response to the natural-language question from the server system to the client system via the Internet so as to inform the user about the subject;

identifying additional informational materials related to the natural-language question;

sending the additional informational materials from the server system to the client system via the Internet;

receiving a referral request from the user requesting that the natural language question be referred to a human representative; and enabling a human representative to respond to the natural language question, wherein the subject relates to a product that the user is interested in obtaining, wherein said method further comprises having at least a second response available for the user, and allowing the user to select one or more of the responses for the natural-language question, wherein said determining is independent of at least one word in the natural-language question, and the response depends on a correct spelling of at least one misspelled word in the natural-language question, and wherein said method furthermore comprises considering at least one additional input entered by the user in determining the response.

69. A computer-implemented method as recited in claim 68, wherein the additional input is a response to an inquiry from the server system.

70. A computer-implemented method as recited in claim 68, wherein the additional input is also a question from the user.

71. A computer-implemented method as recited in claim 68, wherein the server system keeps track of a unique identifier of the user.

72. A computer-implemented method as recited in claim 68, wherein the natural language question is sent to the human representative without the need for the user to re-enter the question into the client system.

73. A computer-implemented method for providing a user with information, said method comprising:

sending informational materials from a server system to a client system via the Internet so as to inform a user of the client system about a subject;

subsequently receiving, at the server system, a request to respond to a natural-Language question asked by the user, the natural language question being asked by the user at the client system, and the natural language question being associated with the subject;

determining, at the server system, a response to the natural-language question, said determining operating to at least analyze the natural-language question using at least grammatical and semantic processing;

sending the response to the natural-language question from the server system to the client system via the Internet so as to inform the user about the subject;

identifying additional informational materials related to the natural-language question;

sending the additional informational materials from the server system to the client system via the Internet;

receiving a referral request from the user requesting that the natural language question be referred to a human representative; and enabling a human representative to respond to the natural language question, wherein the subject relates to a product that the user is interested in obtaining, wherein said determining is independent of at least one word in the natural-language question, and the response depends on a correct spelling of at least one misspelled word in the natural-language question, and wherein said method further comprises considering at least one additional input entered by the user in determining the response.

74. A computer-implemented method as recited in claim 73, wherein the additional input is a response to an inquiry from the server system.

75. A computer-implemented method for providing a user with information, said method comprising:
- sending informational materials from a server system to a client system via the Internet so as to inform a user of the client system about a subject;
- subsequently receiving, at the server system, a request to respond to a natural-language question asked by the user, the natural language question being asked by the user at the client system, and the natural language question being associated with the subject;
- determining, at the server system, a response to the natural-language question, said determining operating to at least analyze the natural-language question using at least grammatical and semantic processing;
- sending the response to the natural-language question from the server system to the client system via the Internet so as to inform the user about the subject;
- identifying additional informational materials related to the natural-language question;
- sending the additional informational materials from the server system to the client system via the Internet; and
- referring the natural language question to a human representative to respond to the natural language question,
- wherein the subject relates to a product that the user is interested in obtaining,
- wherein said method further comprises having at least a second response available for the user, and allowing the user to select one or more of the responses for the natural-language question,
- wherein said determining is independent of at least one word in the natural-language question, and the response depends on a correct spelling of at least one misspelled word in the natural-language question, and
- wherein said determining operates to transform at least a portion of the natural-language question into at least one instruction.

76. A computer-implemented method as recited in claim 75, wherein the natural language question is sent to the human representative without the need for the user to re-enter the question into the client system.

77. A computer-implemented method as recited in claim 75, wherein said method further comprises:
- adapting in real-time to respond to questions by considering at least one additional input.

78. A computer-implemented method as recited in claim 75, wherein the server system has an information database coupled thereto, and wherein the instruction is a query for the database.

79. A computer-implemented method for providing a user with information, said method comprising:
- sending informational materials from a server system to a client system via the Internet so as to inform a user of the client system about a subject;
- subsequently receiving, at the server system, a request to respond to a natural-language question asked by the user, the natural language question being asked by the user at the client system, and the natural language question being associated with the subject;
- determining, at the server system, a response to the natural-language question, said determining operating to at least analyze the natural-language question using at least grammatical and semantic processing;
- sending the response to the natural-language question from the server system to the client system via the Internet so as to inform the user about the subject;
- identifying additional informational materials related to the natural-language question;
- sending the additional informational materials from the server system to the client system via the Internet; and
- referring the natural language question to a human representative to respond to the natural language question,
- wherein the subject relates to a product that the user is interested in obtaining,
- wherein said method further comprises having at least a second response available for the user, and allowing the user to select one or more of the responses for the natural-language question,
- wherein said determining is independent of at least one word in the natural-language question, and the response depends on a correct spelling of at least one misspelled word in the natural-language question, and
- wherein said method furthermore comprises considering at least one additional input entered by the user in determining the response.

80. A computer-implemented method as recited in claim 79, wherein the natural language question is sent to the human representative without the need for the user to re-enter the question into the client system.

81. A computer-implemented method as recited in claim 79, wherein the response is at least two questions related to the natural language question.

82. A computer-implemented method as recited in claim 79, wherein said receiving of the request pertains to receiving at least an indication of a selection by the user of one question to be utilized as the natural language question from at least two questions presented to the user.

83. A computer-implemented method as recited in claim 79, wherein said method further comprises:
- sending at least two questions to the client system; and
- receiving, at the server system, at least an indication of a selection by the user of one of the questions sent by the server system to be responded.

84. A computer-implemented method for providing a user with information, said method comprising:
- sending informational materials from a server system to a client system via the Internet so as to inform a user of the client system about a subject;
- subsequently receiving, at the server system, a request to respond to a natural-language question asked by the user, the natural language question being asked by the user at the client system, and the natural language question being associated with the subject;
- determining, at the server system, a response to the natural-language question, said determining operating to at least analyze the natural-language question using at least grammatical and semantic processing;
- sending the response to the natural-language question from the server system to the client system via the Internet so as to inform the user about the subject;
- identifying additional informational materials related to the natural-language question;
- sending the additional informational materials from the server system to the client system via the Internet; and
- referring the natural language question to a human representative to respond to the natural language question, wherein the subject relates to a product that the user is interested in obtaining, wherein said method further comprises considering at least one additional input entered by the user in determining the response, and wherein said determining operates to transform at least a portion of the natural-language question into at least one instruction.

85. A computer-implemented method as recited in claim 84, wherein the natural language question is sent to the human representative without the need for the user to re-enter the question into the client system.

86. A computer-implemented method as recited in claim 84, wherein the additional input is also a question from the user.

* * * * *